United States Patent
Nakatsu

(10) Patent No.: US 9,886,300 B2
(45) Date of Patent: Feb. 6, 2018

(54) INFORMATION PROCESSING SYSTEM, MANAGING DEVICE, AND COMPUTER READABLE MEDIUM

(71) Applicant: FUJITSU LIMITED, Kawasaki-shi, Kanagawa (JP)

(72) Inventor: Misako Nakatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 15/071,891

(22) Filed: Mar. 16, 2016

(65) Prior Publication Data
US 2016/0283261 A1    Sep. 29, 2016

(30) Foreign Application Priority Data

Mar. 24, 2015  (JP) .................................. 2015-061739

(51) Int. Cl.
G06F 9/455        (2006.01)

(52) U.S. Cl.
CPC .. *G06F 9/45558* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 8,621,069 | B1 * | 12/2013 | Tompkins | G06F 9/5027 709/223 |
| 9,361,145 | B1 * | 6/2016 | Wilson | G06F 9/45558 |
| 2009/0254587 | A1 * | 10/2009 | Shlomai | G06Q 10/10 |
| 2009/0313621 | A1 * | 12/2009 | Dewa | G11B 20/00086 718/1 |
| 2010/0070784 | A1 * | 3/2010 | Gupta | G06F 1/3203 713/310 |
| 2010/0169536 | A1 * | 7/2010 | Shedel | G06F 9/45558 711/6 |

(Continued)

FOREIGN PATENT DOCUMENTS

| | | |
|---|---|---|
| JP | 2010-205200 | 9/2010 |
| JP | 2010-244181 | 10/2010 |

(Continued)

*Primary Examiner* — Mehran Kamran
(74) *Attorney, Agent, or Firm* — Staas & Halsey LLP

(57) ABSTRACT

An information processing system includes a plurality of computers and a management device. Each computer executes a program to generate virtual machines and a plurality of virtual operating systems. The managing device executes migration to migrate virtual operating systems executed on one of the plurality of computers to another computer among the plurality of computers. The managing device is configured to identify a plurality of virtual operating systems to be executed on a same virtual machine upon the migration by detecting a plurality of different virtual operating systems executed on the same virtual machine, each of the plurality of different virtual operating systems running an application program which communicates with other application program running on another one of the plurality of different virtual operating systems, and cause the other computer to generate the virtual machine to which the identified virtual operating systems are to be migrated in advance.

17 Claims, 24 Drawing Sheets

(56) References Cited

U.S. PATENT DOCUMENTS

| | | | | |
|---|---|---|---|---|
| 2012/0303923 | A1* | 11/2012 | Behera | G06F 9/455 711/170 |
| 2013/0160014 | A1* | 6/2013 | Watanabe | G06F 9/50 718/1 |
| 2013/0326506 | A1* | 12/2013 | McGrath | G06F 9/45558 718/1 |
| 2013/0326507 | A1* | 12/2013 | McGrath | G06F 9/4856 718/1 |
| 2014/0026133 | A1* | 1/2014 | Parker | G06F 9/5083 718/1 |
| 2014/0033201 | A1* | 1/2014 | Dawkins | G06F 11/1484 718/1 |
| 2014/0068611 | A1* | 3/2014 | McGrath | G06F 9/45533 718/1 |
| 2014/0068779 | A1* | 3/2014 | Tan | G06F 21/606 726/26 |
| 2014/0149984 | A1* | 5/2014 | Takahashi | G06F 9/4856 718/1 |
| 2014/0189050 | A1* | 7/2014 | Rijsman | H04L 47/2408 709/217 |
| 2014/0223427 | A1* | 8/2014 | Bootland | G06F 8/61 718/1 |
| 2014/0245069 | A1* | 8/2014 | Hu | G06F 11/362 714/38.1 |
| 2014/0344440 | A1* | 11/2014 | Dutta | H04L 41/0823 709/224 |
| 2015/0052523 | A1* | 2/2015 | Raghu | G06F 9/45533 718/1 |
| 2015/0150003 | A1* | 5/2015 | Emelyanov | G06F 9/455 718/1 |
| 2015/0150129 | A1* | 5/2015 | Giura | H04L 63/1441 726/23 |
| 2015/0154056 | A1* | 6/2015 | Chen | G06F 9/4856 718/103 |
| 2015/0169306 | A1* | 6/2015 | Labocki | G06F 8/60 717/176 |
| 2015/0278061 | A1* | 10/2015 | Siciliano | G06F 11/3034 702/186 |
| 2015/0378771 | A1* | 12/2015 | Tarasuk-Levin | G06F 9/45558 718/1 |
| 2016/0205518 | A1* | 7/2016 | Patel | H04L 67/1002 455/518 |
| 2016/0217050 | A1* | 7/2016 | Grimm | G06F 11/203 |
| 2016/0274928 | A1* | 9/2016 | Linton | G06F 9/45558 |
| 2016/0371353 | A1* | 12/2016 | Serafini | G06F 9/5061 |
| 2016/0378518 | A1* | 12/2016 | Antony | G06F 9/45533 718/1 |
| 2016/0378563 | A1* | 12/2016 | Gaurav | G06F 9/5077 718/1 |
| 2016/0378564 | A1* | 12/2016 | Gaurav | G06F 9/5077 718/1 |

FOREIGN PATENT DOCUMENTS

| | | |
|---|---|---|
| JP | 2012-58815 | 3/2012 |
| WO | WO 2012/120664 A1 | 9/2012 |

* cited by examiner

FIG. 8

| ITEM | CONTAINER 1 | CONTAINER 2 | PRIORITY |
|---|---|---|---|
| 1 | EXTERNAL COMMUNICATION + INTERNAL COMMUNICATION WITH CONTAINER 2 | EXTERNAL COMMUNICATION + INTERNAL COMMUNICATION WITH CONTAINER 2 | HIGH (INTERNAL COMMUNICATION IS TO BE EXECUTED) |
| 2 | EXTERNAL COMMUNICATION + INTERNAL COMMUNICATION WITH CONTAINER 2 | INTERNAL COMMUNICATION WITH CONTAINER 1 | HIGH |
| 3 | EXTERNAL COMMUNICATION | EXTERNAL COMMUNICATION | MIDDLE (COMMUNICATION MAY BE EXECUTED IN SAME HOST COMPUTER) |
| 4 | EXTERNAL COMMUNICATION | NONE | LOW (COMMUNICATION IS NOT EXECUTED BETWEEN CONTAINERS) |
| 5 | INTERNAL COMMUNICATION WITH CONTAINER 2 | INTERNAL COMMUNICATION WITH CONTAINER 1 | MIDDLE (SINCE EXTERNAL COMMUNICATION IS NOT EXECUTED AND BUSINESS PROCESS IS NOT EXECUTED BUT MAY BE EXECUTED IN FUTURE) |
| 6 | NONE | NONE | LOW (COMMUNICATION IS NOT EXECUTED BETWEEN CONTAINERS) |

FIG. 13

| HOST | CPU RESOURCE | CPU USAGE STATUS | | | | AVAILABLE CPU RESOURCE |
|---|---|---|---|---|---|---|
| | | VM | APPLICATION | CPU UTILIZATION | | |
| HOST 1 | 9.0 GHz | VM A | Web A | 0.8 GHz | 1.8 GHz | 2.0 GHz |
| | | | DB A | 1.0 GHz | | |
| | | VM B | App B1 | 0.5 GHz | 2.2 GHz | |
| | | | App B2 | 1.7 GHz | | |
| | | VM C | Web C | 1.2 GHz | 3.0 GHz | |
| | | | App C | 1.8 GHz | | |
| | | TOTAL UTILIZATION | | 7.0 GHz | | |
| HOST 2 | 7.5 GHz | VM D | -- | 2.2 GHz | | 3.5 GHz |
| | | VM E | Web E | 1.0 GHz | 1.8 GHz | |
| | | | App E | 0.8 GHz | | |
| | | TOTAL UTILIZATION | | 4.0 GHz | | |
| HOST 3 | 11.5 GHz | VM F | -- | 4.5 GHz | | 3.5 GHz |
| | | VM G | -- | 3.5 GHz | | |
| | | TOTAL UTILIZATION | | 8.0 GHz | | |

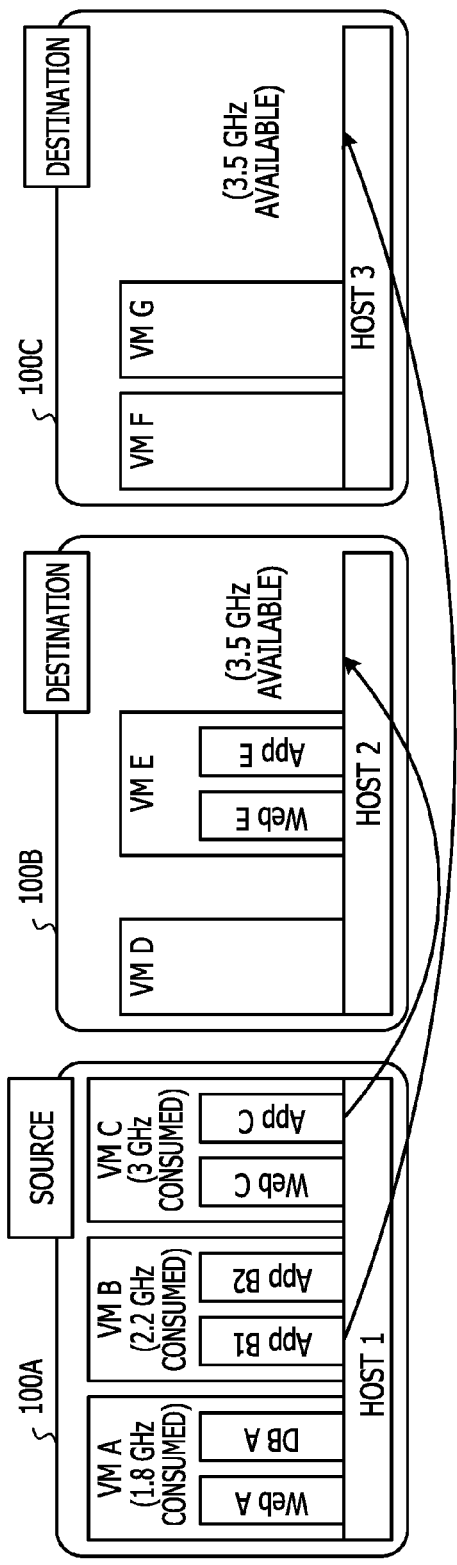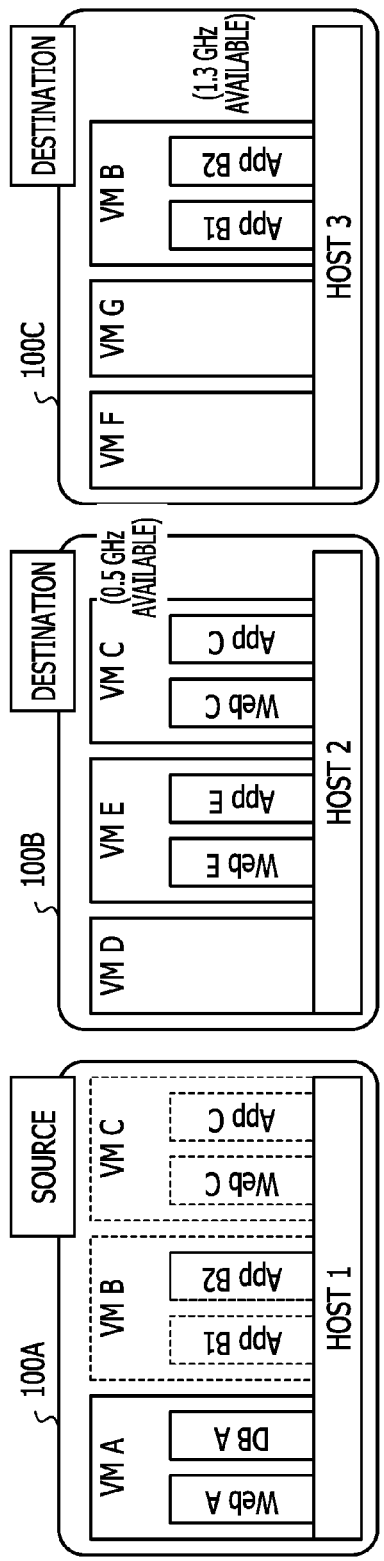

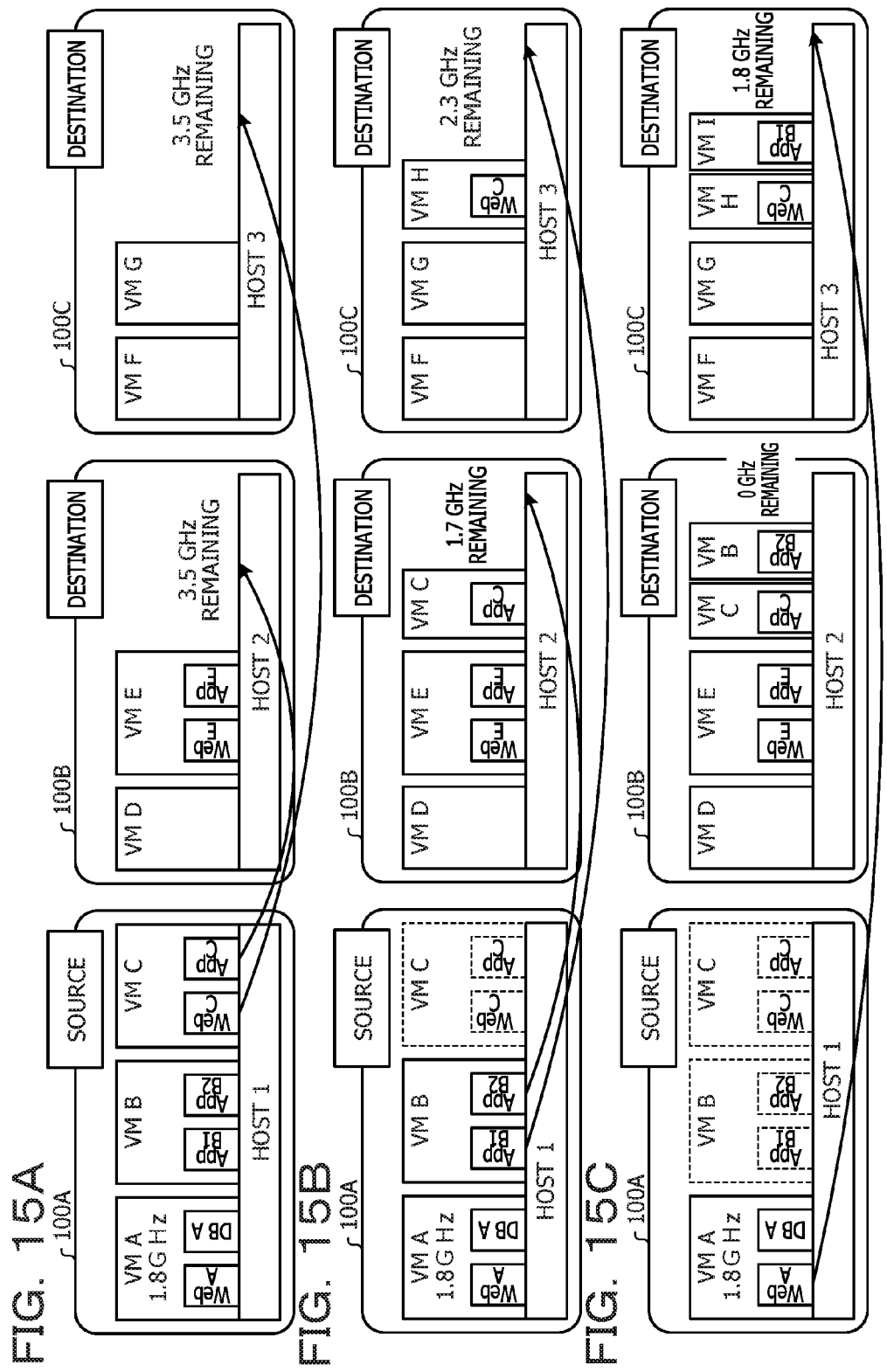

INFORMATION PROCESSING SYSTEM, MANAGING DEVICE, AND COMPUTER READABLE MEDIUM

CROSS-REFERENCE TO RELATED APPLICATION

This application is based upon and claims the benefit of priority of the prior Japanese Patent Application No. 2015-061739, filed on Mar. 24, 2015, the entire contents of which are incorporated herein by reference.

FIELD

The embodiment discussed herein is related to an information processing system, a managing device, and a computer readable medium.

BACKGROUND

In a so-called cloud computing environment, a virtualized application execution environment is provided for users. As the virtualized application execution environment, there is a hypervisor-based virtualization environment, for example. In hypervisor-based virtualization, a VM guest environment that is an execution environment for a virtual machine ("VM") is provided for a user. The VM is obtained by virtualizing hardware of a host computer (also referred to as "server" in some cases) serving as a host for the VM. An operating system (OS) is activated on the VM, while an application program is executed on the OS executed on the VM.

In the hypervisor-based virtualization environment, if a task of maintaining the host computer is performed or a failure of the host computer occurs, a business process may be continued by executing live migration to dynamically migrate the VM from the host computer to be maintained to another host computer without the stop of the VM. Hereinafter, the migration of a VM or the migration of a process or the like of an application program executed on a VM is referred to as "migration".

There are the following conventional techniques related to the virtualization of a server. A technique for estimating relative maximum load amounts of virtual machines from correlation relationships between loads of the virtual machines and executing the virtual machines on virtual machine servers (physical machines) based on the estimated maximum load amounts of the virtual machines is known (refer to, for example, Japanese Laid-open Patent Publication No. 2010-244181). In addition, a technique for causing a processor executing a virtual machine to calculate consumption power based on the amount of a resource to be consumed upon the execution of a software process and migrating the software process between the processor and another processor based on the result of the calculation is known (refer to, for example, Japanese Laid-open Patent Publication No. 2010-205200). Furthermore, a technique for estimating, for migration of a virtual computer, a load of a destination physical computer in order to inhibit a load of the destination physical computer from becoming excessive and for migrating the virtual computer if the load of the destination physical computer is in an acceptable range is known (refer to, for example, International Publication Pamphlet No. WO 2012/120664).

SUMMARY

According to an aspect of the invention, an information processing system includes a plurality of computers and a management device. Each of the plurality of computers executes a program to generate virtual machines and to generate a plurality of virtual operating systems. The managing device executes migration to migrate virtual operating systems executed on one of the plurality of computers to another computer among the plurality of computers. The managing device is configured to identify a plurality of virtual operating systems to be executed on a same virtual machine upon the migration by detecting a plurality of different virtual operating systems executed on the same virtual machine, each of the plurality of different virtual operating systems running an application program which communicates with other application program running on another one of the plurality of different virtual operating systems, and cause the other computer to generate the virtual machine to which the identified virtual operating systems are to be migrated in advance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a table indicating an example of the ranking of priorities of containers based on communication states of the containers;

FIG. 13 illustrates an example of information acquired by an administration manager from each host computer and indicating usage statuses of hardware resources in the execution example illustrated in FIG. 7;

FIGS. 14A and 14B are first diagrams describing the simulation of the migration of virtual machines or containers in an execution example illustrated in FIG. 13;

FIGS. 15A, 15B, and 15C are second diagrams describing the simulation of the migration of the virtual machines or containers in the execution example illustrated in FIG. 13;

DESCRIPTION OF EMBODIMENT

Figure 1:
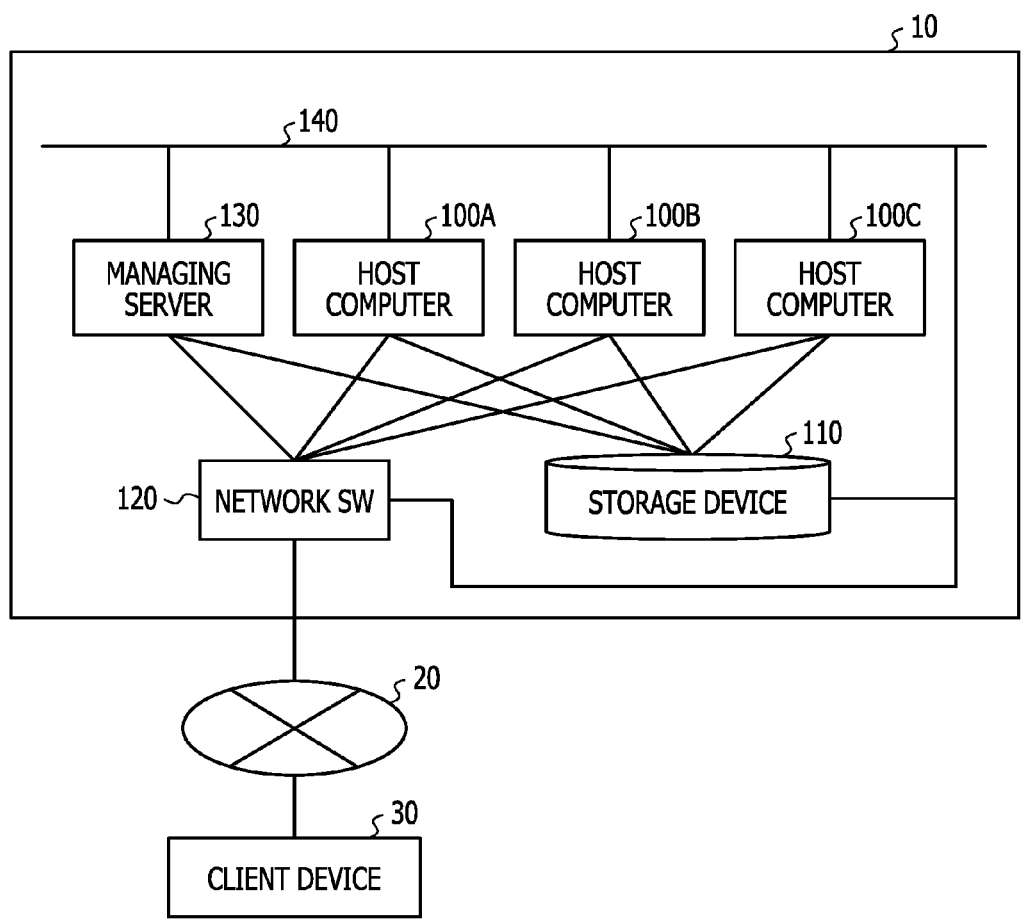
FIG. 1 illustrates a system configuration of an information processing system according to an embodiment.

In recent years, application execution environments obtained by container-based virtualization have started to be widely used. The container-based virtualization is different from virtualization to be executed to virtualize hardware of servers or the like and thereby obtain VMs and is a technique for separating a process space of an OS into multiple groups and using the multiple groups as different servers. Thus, the container-based virtualization is also referred to as "OS virtualization". Examples of the container-based virtualization technique are Docker (registered trademark) that is a container-based virtualization environment provided by Docker, Inc., Solaris (registered trademark) containers, and BSD jails.

In the container-based virtualization environment, a virtualization function is installed in a host OS, and multiple virtual application execution environments (virtual OSs) are generated. The virtual OSs that are generated in the container-based virtualization environment and are the virtual application execution environments are hereinafter referred to as "containers".

In the container-based virtualization, an internal part of a single OS environment is divided and parts related to the execution of applications on the OS are individually generated. A basic part of the OS environment that is a kernel and the like is shared by the containers, and OS parts of which settings are to be changed for the containers and are specific to the containers are individually generated. Application environments that are independent of each other are provided for the containers. It is, therefore, easy to execute and manage business processes using the virtualization environment by multiple users.

In the container-based virtualization, a process is not executed through a hypervisor, and thus an overhead upon the use of a physical resource of a server device is small and an execution speed in the virtualization environment is high. In addition, since a basic part of the OS is shared between multiple containers, the use of a memory resource may be suppressed and many applications may be activated. Furthermore, since the overall OS is not newly activated for each time of the generation of a container, containers are activated at a high speed and environments for the containers are easily built.

Hypervisor-based virtualization and the container-based virtualization are compared with each other and described below. In the hypervisor-based virtualization, each guest OS is activated for a respective VM, and thus OSs that are different for VMs may be executed. In the container-based virtualization, since only a single OS that serves as a base exists, applications for different OSs are not simultaneously executed. In addition, live migration is not executed in the container-based virtualization, differently from the hypervisor-based virtualization.

Hybrid virtualization that is obtained by combining the hypervisor-based virtualization with the container-based virtualization and is executed has started to be applied. In the hybrid virtualization, the following advantages are obtained: an advantage of live migration of VMs and an advantage that business processes by containers are easily managed.

In the hybrid virtualization, if a failure of a host computer or the like occurs, business processes may be continued by executing live migration to migrate, to another host computer, a VM on which multiple containers are executed. In the live migration, information of the VM loaded on a memory of the host computer to be maintained is transmitted to a memory of the destination host computer. In addition, the computer that references data stored in a storage device shared by the source host computer and the destination host computer is switched from the source host computer to the destination host computer. By executing the switching, the host computer that executes the VM may be switched from the source host computer to the destination host computer within a short time period in which a business process executed on the VM is not adversely affected.

If a resource of the host computer to which the VM on which the multiple containers are executed is to be migrated by the live migration is not sufficient, the VM is not executed by the live migration. In this case, it is considered that the multiple containers executed on the VM are separated from each other and migrated to VMs executed on different host computers.

If communication between containers is not recognized due to a restriction of security management of user data, and multiple containers that communicate with each other are separated from each other and migrated to different VMs, business processes executed on the containers are not continued in some cases. Thus, if containers that are among containers executed on the same VM and communicate with each other are to be migrated, the containers are to be migrated to the same VM so that business processes are continued.

In addition, if multiple containers executed on a VM are separated from each other and migrated to different VMs, the live migration may not be executed on the VMs in a state in which all the multiple containers are executed. In this case, at least one of the separated containers to be migrated to the other VMs is temporarily stopped. Then, a new VM is activated on a host computer to which the stopped container is to be migrated. After the activation of a guest OS and the generation of a container environment on the activated VM, the stopped container is migrated. A time period for activating the guest OS is equal to or close to a time period for activating a normal OS. In addition, the container environment is to be built on the activated VM, and the separated containers are to be migrated to the built container environment. Thus, if containers executed on the guest OS are separated from each other and migrated to different VMs, a business process executed on the stopped container may be stopped during a process of generating the container environment to which the stopped container is to be migrated and a process of migrating the stopped container, and thus the business process may be adversely affected.

An object of an aspect of an embodiment is to migrate multiple processes that are among business processes executed in a virtualization environment and communicate with each other and are related to each other in a state in which the business processes are continued. The embodiment is described with reference to the accompanying drawings.

FIG. 1 is a diagram illustrating a system configuration of an information processing system 10 according to the embodiment. As illustrated in FIG. 1, the information processing system 10 according to the embodiment includes host computers 100A, 100B, and 100C, a storage device 110, a network switch 120, and a managing server 130. The information processing system 10 is connected to a client device 30 through a network 20 for external communication lines. The network 20 is the Internet or the like, for example. The information processing system 10 executes, in accordance with a request received from a user through the client device 30, an application program related to a task of the user and provides a service based on the request from the user, for example.

The host computers 100A, 100B, and 100C are server devices that execute application programs related to tasks of users. The host computers 100A, 100B, and 100C are referred to as host computers 100, unless otherwise distinguished. The host computers 100 execute the aforementioned hypervisor-based virtualization, the container-virtualization, and the hybrid virtualization obtained by combining the hypervisor-based virtualization with the container-virtualization and provide virtualized application execution environments for the users, for example. FIG. 1 illustrates an example in which the three host computers 100A, 100B, and 100C are provided. The number of host computers 100, however, is not limited to three. If a failure occurs in a host computer among the host computers 100, another host computer may be installed by a maintenance task or the failed host computer may be replaced with another host computer by a maintenance task, and a service provided to the users is continued.

The storage device 110 is a device for storing data and OSs to be executed on the host computers 100, data of application programs, data to be used by applications of the users, and the like.

The network switch 120 is connected to the network 20 and controls communication between a device connected to the network and the host computers 100 and the managing server 130. The managing server 130 communicates with the host computers 100A to 100C, storage device 110, network switch 120, and the like included in the information processing system 10 through a local bus 140 included in the information processing system 10 and manages the devices included in the information processing system 10. The local bus 140 is a communication line within the information processing system 10. The managing server 130 is an example of a managing device.

Figure 2:
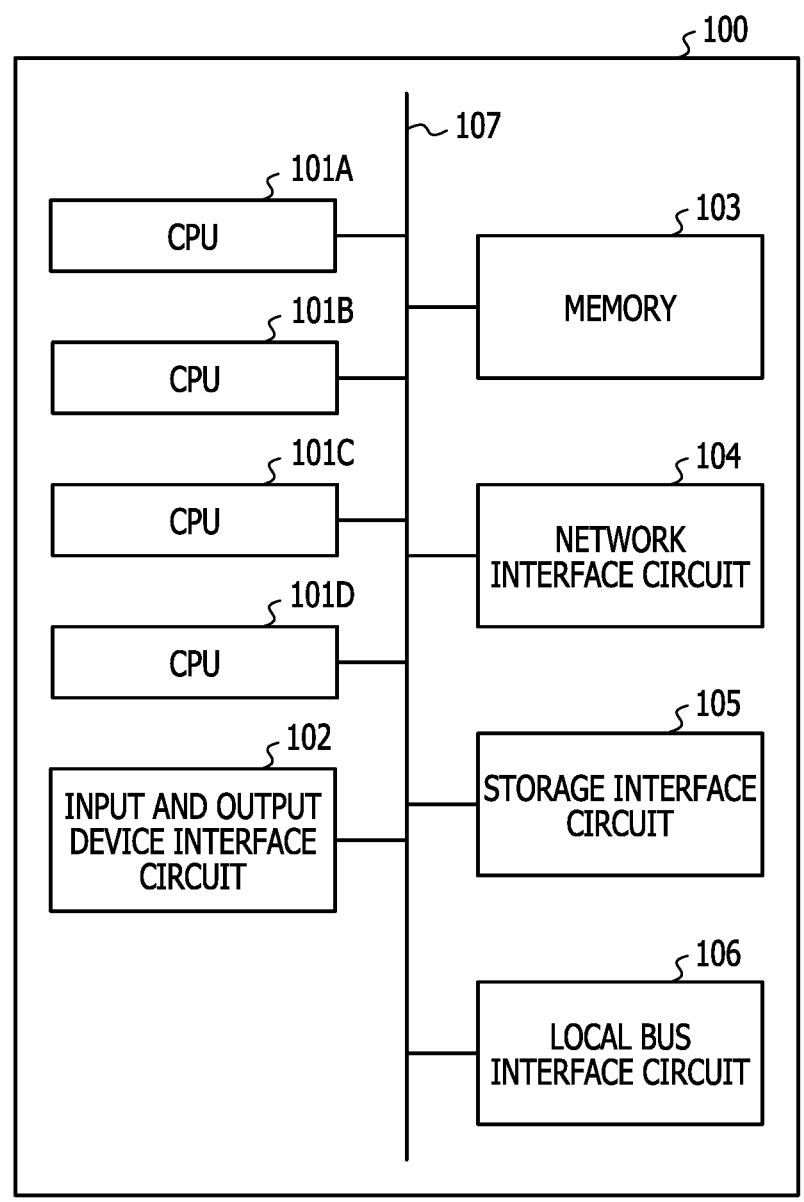
FIG. 2 illustrates an example of a hardware configuration of each host computer.

FIG. 2 is a diagram illustrating an example of a hardware configuration of each of the host computers 100. The host computers 100 each include CPUs 101 (101A to 101D), an input and output device interface circuit 102, a memory 103, a network interface circuit 104, a storage interface circuit 105, and a local bus interface circuit 106. The CPUs 101 each access the memory 103, the input and output device interface circuit 102, the other interface circuits 104 to 106, and the like through an internal bus 107.

The CPUs 101 (101A to 101D) are electronic parts of processors such as central processing units (CPUs), microprocessing units (MPUs), or the like. In the example illustrated in FIG. 2, the host computers 100 each include the four CPUs, the CPU 101A, the CPU 1016, the CPU 101C, and the CPU 101D. The number of CPUs included in each of the host computers 100, however, is not limited to four. The host computers 100 may each include five or more CPUs. In addition, the CPUs 101 may each include multiple CPU cores and hardware threads, and each of the CPUs 101 may execute processes of multiple application programs. Furthermore, the numbers of CPUs included in the host computers may be different from each other.

The input and output device interface circuit 102 is a circuit for controlling input and output from and to peripheral devices including devices such as a mouse (not illustrated) and a keyboard (not illustrated). The memory 103 is a storage device such as a random access memory (RAM). In FIG. 2, the single memory 103 is illustrated. The memory 103, however, may include multiple RAMs. In addition, different memories 103 (103A, 103B, 103C, and 103D) may be provided for the CPUs 101A to 101D.

The network interface circuit 104 is an interface circuit for communicating with another device through the network 20. In the example illustrated in FIG. 2, the network interface circuit 104 is connected to the network 20 through the network switch 120. The storage interface circuit 105 is an interface circuit for accessing the storage device 110. The local bus interface circuit 106 is an interface circuit for communicating with the other host computers 100, managing server 130, and the like included in the information processing system through the local bus 140.

A program for generating virtualization environments 200 and 210 to be executed by each of the host computers 100, a program for executing business processes of applications to be executed on VMs or containers, and data to be used to execute the business processes of the applications, are stored in the memory 103 and the storage device 110 and described later. The CPUs 101 read the programs and data stored in the storage device 110 and programs and data stored in the memory 103 and execute program processes related to the virtualization environments 200 and 210 and programs related to the business processes of the applications executed on the VMs or containers.

Figure 3:
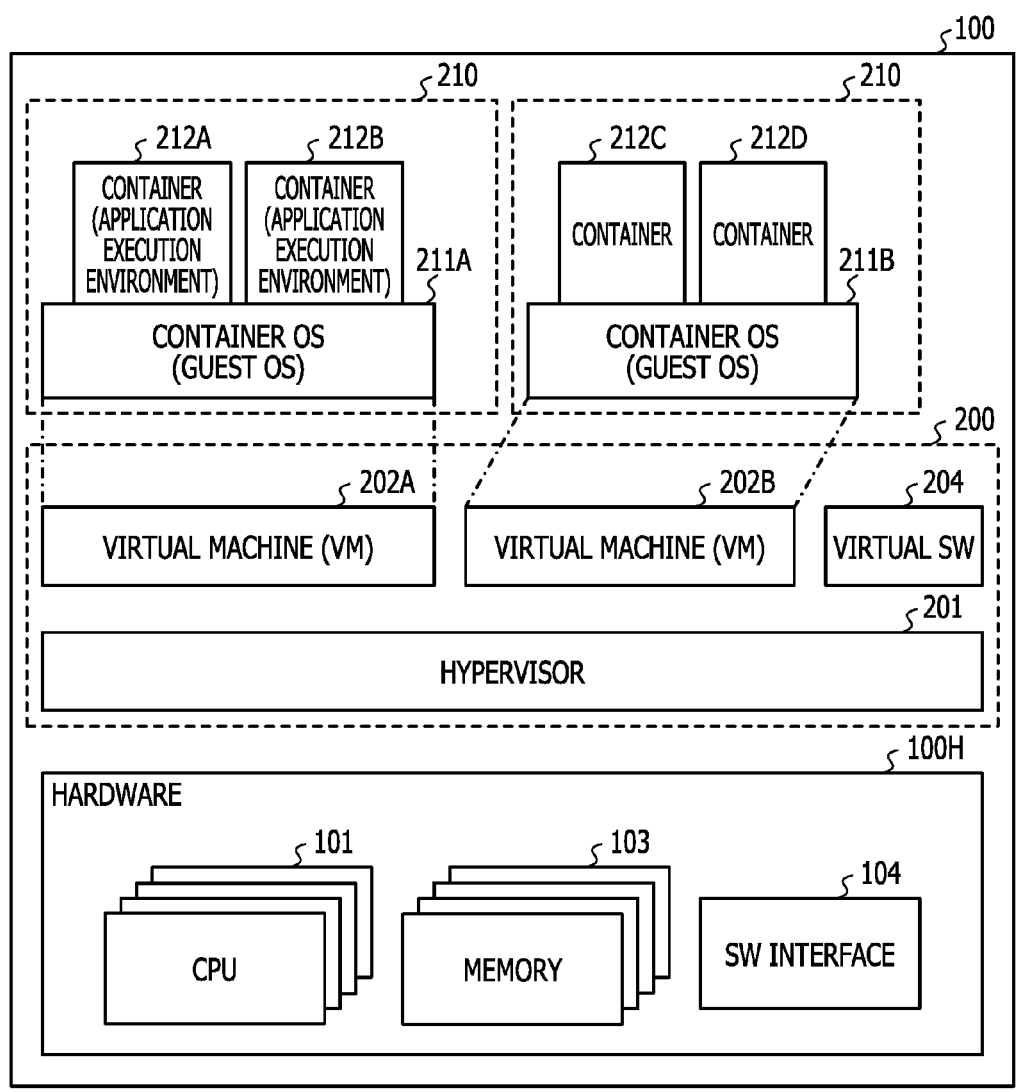
FIG. 3 is a diagram describing application execution environments in each host computer.

FIG. 3 is a diagram describing application execution environments in each of the host computers 100. FIG. 3 schematically illustrates a hardware configuration of each of the host computers 100 and configurations of software execution environments. A hybrid virtualization environment in which the hypervisor-based virtualization environment 200 is executed and the container-based virtualization environments 210 are executed on virtual machines 202 is provided using the CPUs 101, memories 103, and the like included in a hardware block 100H of the host computer 100.

The hypervisor-based virtualization environment 200 includes a hypervisor 201 and the virtual machines 202 generated by the hypervisor 201. The hypervisor 201 is configured to activate and delete the virtual machines 202 and control requests to access the hardware resource 100H from programs executed on the virtual machines 202. The hypervisor 201 also controls a virtual switch 204 obtained by virtualizing a hardware resource of the network switch 120 illustrated in FIG. 1.

If a failure occurs in the hardware of the host computer 100 or the hardware of the host computer 100 is maintained, the hypervisor 201 executes a process of executing live migration on the virtual machines. If the live migration is to be executed to migrate the virtual machines to another host computer 100, the hypervisor 201 executes the live migration while coordinating with a hypervisor 201 executed on the other host computer 100.

The virtual machines 202A and 202B are obtained by virtualizing the hardware resource 100H of the host computer 100. The software execution environments that are independent of each other are provided for the virtual machines 202A and 202B. For example, different OSs may be executed on the virtual machines 202A and 202B, respectively. The virtual machines 202A and 202B are referred to as virtual machines 202, unless otherwise distinguished.

In the example illustrated in FIG. 3, the container-based virtualization environments 210 are provided for the virtual machines 202A and 202B, respectively. In the container-based virtualization environments, Linux (registered trademark) OSs are activated on the virtual machines 202, and container virtualization software such as Docker (registered trademark) is installed on the Linux OSs, for example. In the example illustrated in FIG. 3, guest OSs such as the Linux OSs in which the container virtualization software is installed are referred to as "container OSs". FIG. 3 illustrates the example in which two containers are executed on each of the container OSs 211A and 211B. The numbers of containers executed on the container OSs 211 are not limited to two. Containers of which the number is requested by a user may be executed on each of the container OSs 211.

In the container virtualization environments 210, the containers 212 that are the application execution environments independent of each other are provided by the container OSs 211. In the container-based virtualization, application execution environments generated in the past are stored as images in a shared file. New containers may be easily generated by copying the stored images and adding settings for the application execution environments. Thus, the container-based virtualization environments are suitable to build Platform as a Service (PaaS) or the like.

In an environment for PaaS or the like, if an application program executed on a container of another user is referenced, a problem with security occurs. On the other hand, if multiple business applications related to each other are executed on different containers by the same user, communication is to be executed between the containers in some cases. Thus, in a container-based virtualization environment for Docker or the like, a function of specifying whether or not communication between containers is permitted upon the activation of the containers is provided. For example, in Docker, whether or not the communication between the containers is permitted may be determined using a "--icc" flag (inter-container communication flag) that is an argument of a container activation command. In addition, communication with a specific container may be controlled and permitted by a link function. The functions to be used for the execution of communication between containers are provided as functions of the container OSs 211.

Communication between containers 212A and 212B may be set by setting a flag upon the activation of the containers on the container OS 211A or executing the setting by the link function. However, since the containers 212C and 212D are executed on the container OS 211B, communication between the containers 212A and 212C executed on the different containers OSs 211 may not be executed. In this case, the communication between the containers 212A and 212C may be achieved by packet communication through the network switch 120.

In the example illustrated in FIG. 3, the virtual switch 204 is obtained by virtualizing a function of the network switch 120, and the containers 212A and 212C exist on the same host computer 100. Thus, a communication packet is transmitted from the container 212A to the container 212C through the virtual switch 204 without passing through the network switch 120 within the host computer 100.

Figure 4:
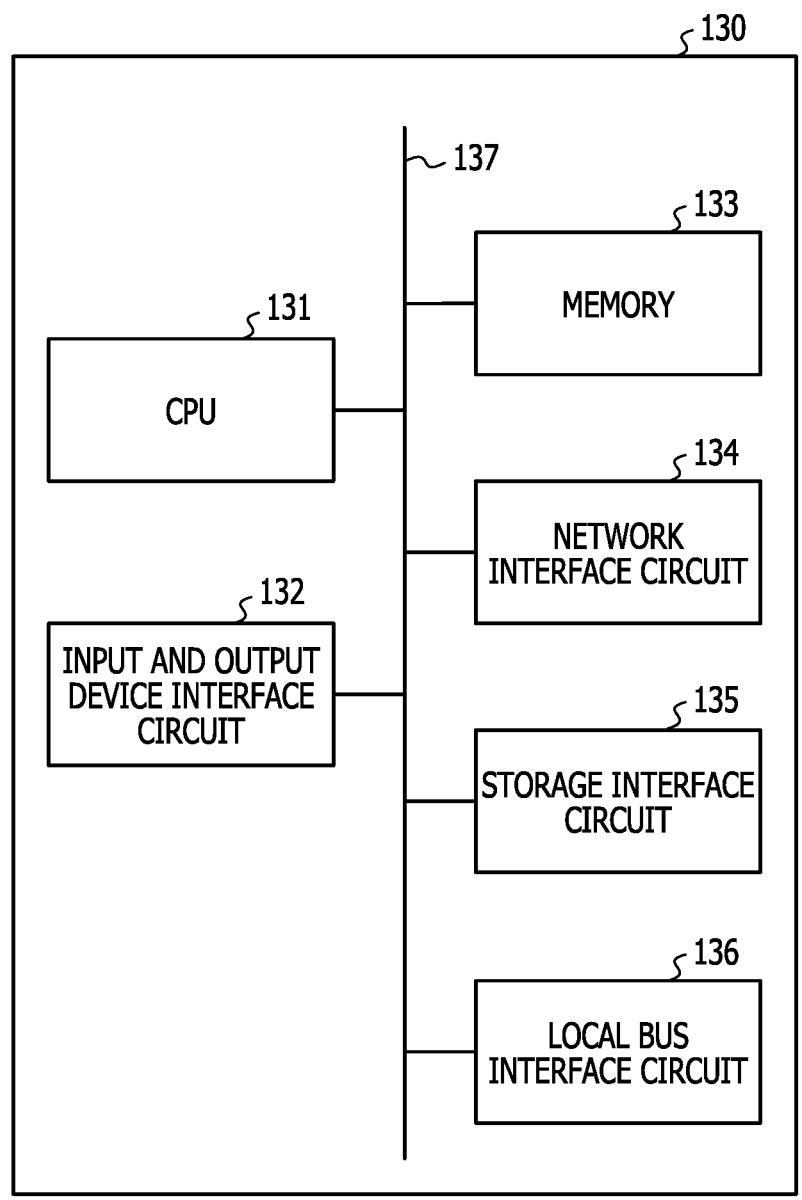
FIG. 4 illustrates an example of a hardware configuration of a managing server.

FIG. 4 is a diagram illustrating an example of a hardware configuration of the managing server 130. The managing server 130 includes a CPU 131, an input and output device interface circuit 132, a memory 133, a network interface circuit 134, a storage interface circuit 135, and a local bus interface circuit 136. The CPU 131 accesses the memory 133, the input and output device interface circuit 132, and the interface circuits 134 to 136 through an internal bus 137.

The input and output device interface circuit 132 is a circuit for controlling input and output from and to peripheral devices including devices such as a mouse (not illustrated) and a keyboard (not illustrated). The network interface circuit 134 is an interface circuit for communicating with another device through the network 20. The storage interface circuit 135 is an interface circuit for accessing the storage device 110. The local bus interface circuit 136 is an interface circuit for communicating with the host computers 100A to 100C, the storage device 110, and the network switch 120 through the local bus 140.

The CPU 131 manages the host computers 100A to 100C by executing programs stored in the storage device 110 and the memory 133. The CPU 131 executes a program for executing various processes by an administration manager for managing the virtualized application execution environments (200 and 210) executed on the host computers 100A to 100C within the information processing system 10. Details of the processes by the administration manager are described later.

Figure 5:
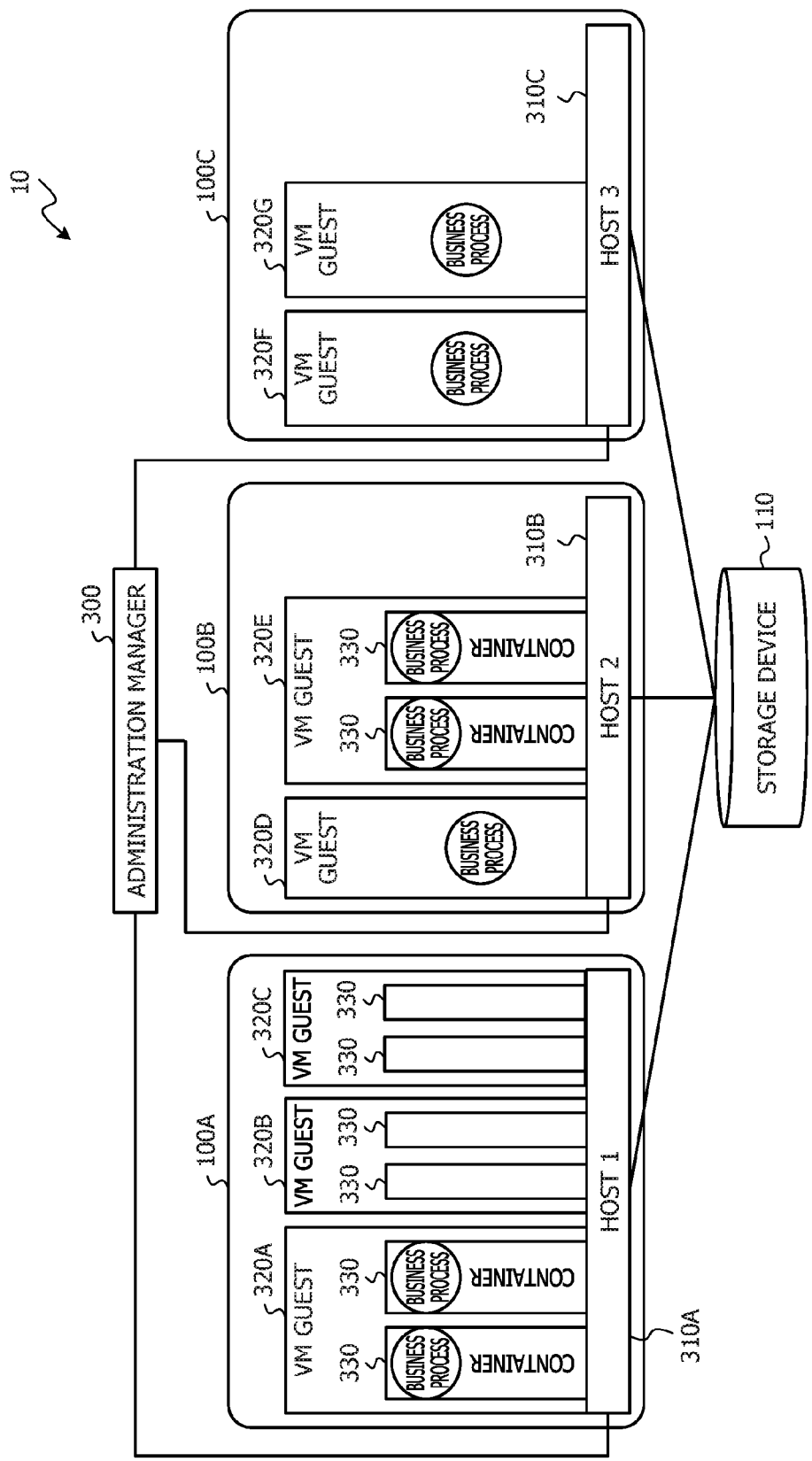
FIG. 5 is a diagram describing an example of application execution environments within the information processing system.

FIG. 5 is a diagram describing an example of the application execution environments within the information processing system 10. FIG. 5 schematically illustrates processes of the host computers 100A to 100C within the information processing system 10 and a process of the managing server 130. The administration manager 300 that is an execution management program provided for the system and to be executed on the CPU 131 of the managing server 130 manages virtualization environments executed on the host computers 100A to 100C.

In FIG. 5, each of hosts 310A, 310B, and 310C that are included in the host computers 100A, 100B, and 100C is illustrated by schematic representation of the hardware 100H illustrated in FIG. 3 and a functional block including the hypervisor 201 illustrated in FIG. 3. In addition, VM guests 320A to 320G are execution environments for virtual machines and are activated on the hosts 310A, 310B, and 310C and provided for users. FIG. 5 assumes that containers 330 are executed on the VM guests 320A, 320B, 320C, and 320E and that application programs related to tasks of the users are executed on the containers. Hereinafter, the hosts 310A to 310C are referred to as hosts 310, unless otherwise distinguished. The VM guests 320A to 320G are referred to as VM guests 320, unless otherwise distinguished.

The user application programs executed on the VM guests 320 or containers 330 and data used by the application programs are stored in the storage device 110. The application programs stored in the storage device 110 or the data stored in the storage device 110 are or is read by the CPUs 101 included in the hosts 310 and used upon the execution of the applications.

Figure 6:
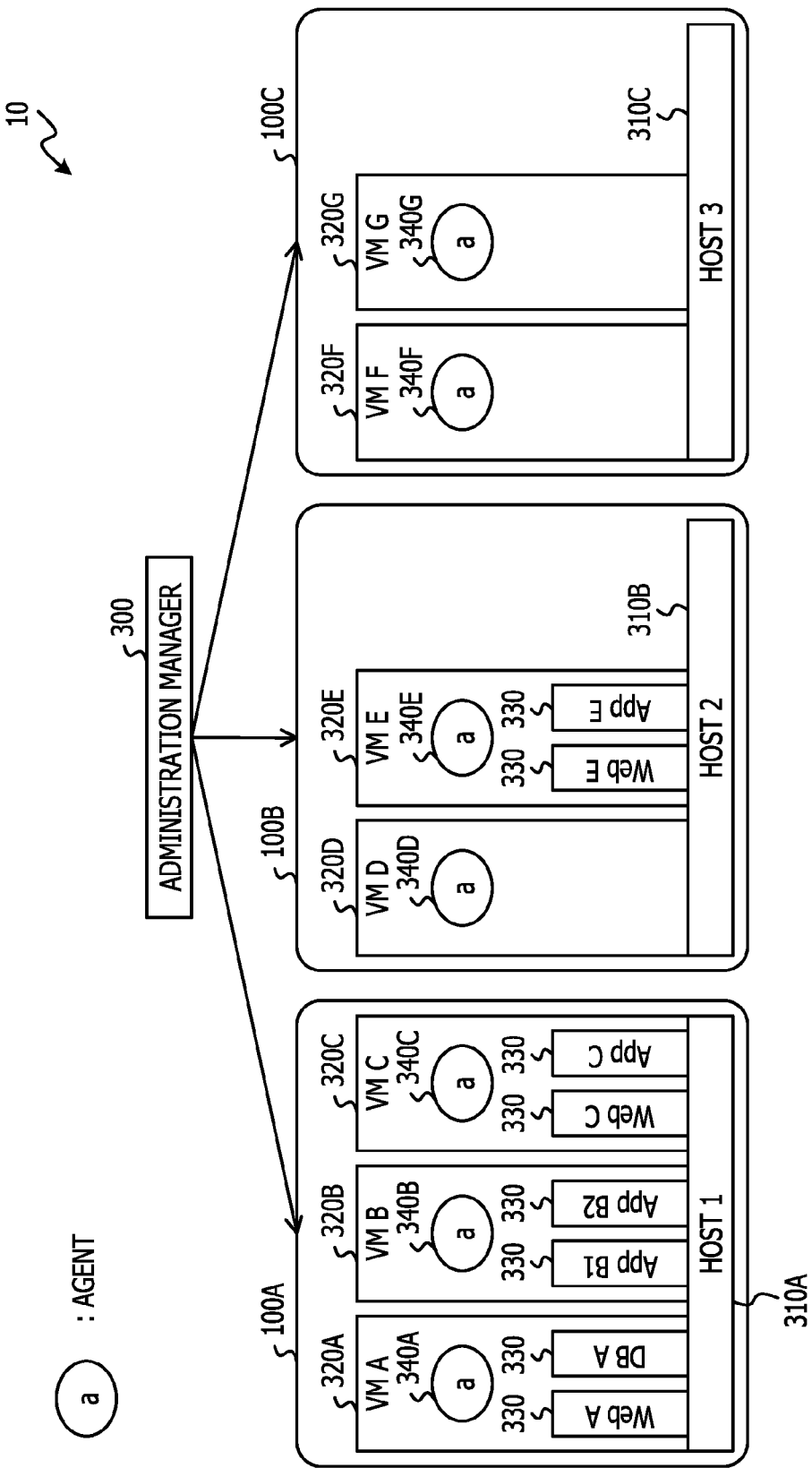
FIG. 6 is a diagram describing an example of the execution of business applications within the information processing system.

FIG. 6 is a diagram describing an example of the execution of business applications within the information processing system 10. FIG. 6 illustrates an example in which different application programs are executed on the containers 330 illustrated in the example of the application execution environments in FIG. 5.

FIG. 6 assumes that applications "Web A" and "DB A" are executed on two containers 330 executed on the VM guest 320A. In addition, FIG. 6 assumes that applications "App B1" and "App B2" are executed on two containers 330 executed on the VM guest 320B. Furthermore, FIG. 6 assumes that applications "Web C" and "App C" are executed on two containers 330 executed on the VM guest 320C. Furthermore, FIG. 6 assumes that applications "Web E" and "App E" are executed on two containers 330 executed on the VM guest 320E. In this case, "Web" indicates a web server program and "DB" indicates a database (DB) server program, for example.

On the container OSs 211 executed on the VM guests 320, agents 340A to 340G (indicated by "a" in FIG. 6) that are programs for collecting information on the VM guests 320 are executed. The agents 340A to 340G are hereinafter referred to as agents 340, unless otherwise distinguished. The agents 340 are implemented as daemon programs to be executed on the container OSs 211 and are executed independently of application programs executed on the VM guests 320, for example.

Figure 7:
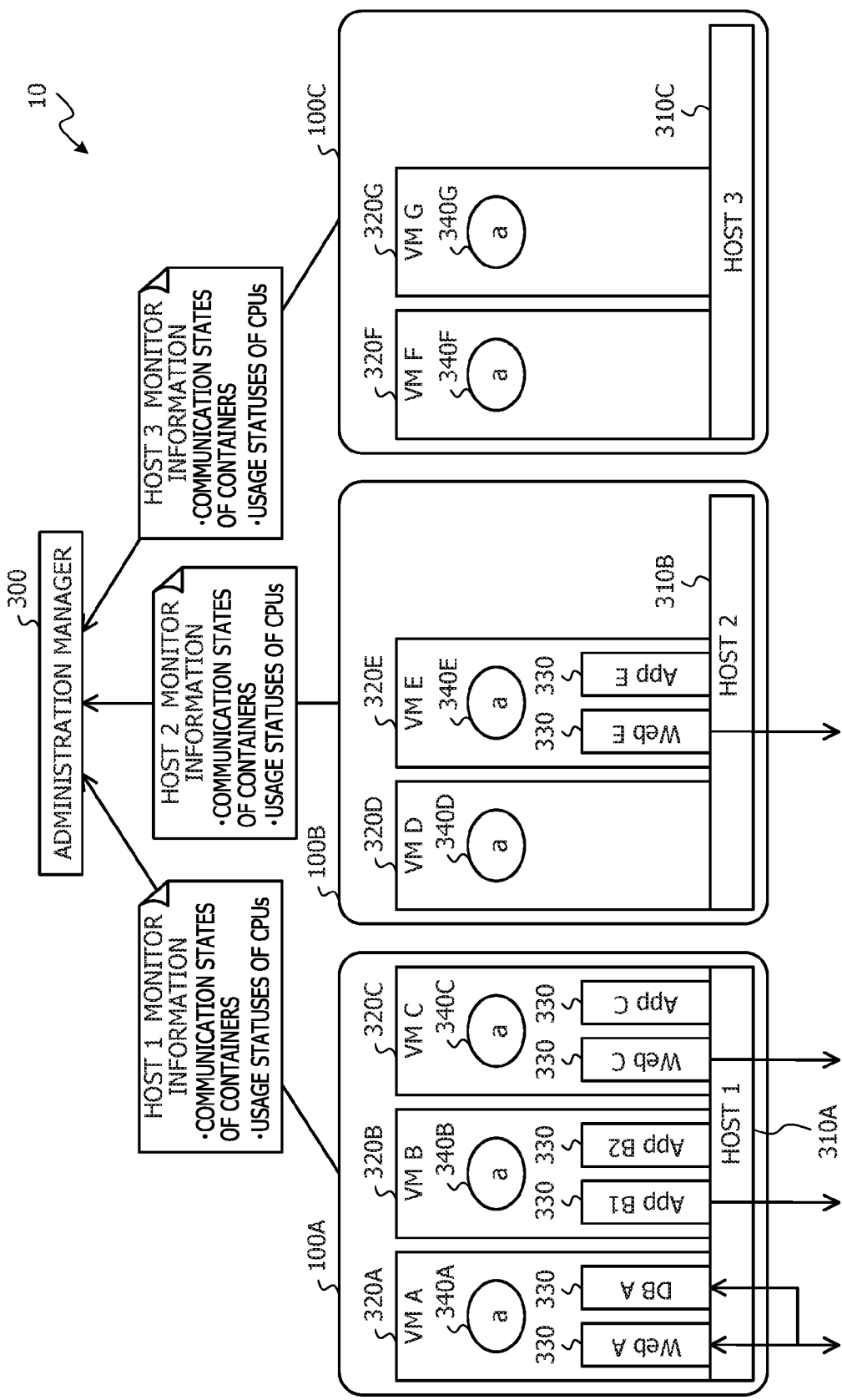
FIG. 7 is a diagram describing processes of agents executed on VM guests in the execution example illustrated in FIG. 6.

FIG. 7 is a diagram describing processes of the agents 340 executed on the containers 330 of the VM guests 320 in the execution example illustrated in FIG. 6. In FIG. 7, arrows that extend downward from the containers on which the applications "Web A", "App B1", "Web C", and "Web E" are executed indicate that the applications communicate with externals of the VM guests 320 by communication functions provided by the containers 330. A bidirectional arrow between the applications "Web A" and "DB A" indicates communication between the applications or communication between the containers on which the applications are executed.

The devices that are the host computers 100 and the like and are included in the information processing system 10 may be replaced with other devices for maintenance or may be periodically maintained due to a hardware failure or the like. In these cases, it is desirable that a process of an application program related to a task of a user and executed on a host computer 100 to be maintained be migrated to a virtual machine on another host computer 100 in a state in which the execution of the process is continued. If hardware resources (CPU throughput, an available memory capacity, and the like) of the host computer 100 to which the virtual machine is to be migrated are not available, the migration may not be appropriately executed.

Thus, at specific times, the administration manager 300 checks whether or not processes of application programs executed in virtualization environments on each of the host computers 100 are able to be migrated to virtualization environments on the other host computers 100. Specifically, the administration manager 300 collects, from the host computers 100, information of hardware resources of the host computers 100 and monitor information including the amounts of resources consumed by the application programs executed on the VM guests 320 or containers 330. If a VM guest 320 is to be migrated, the VM guest 320 is migrated to a destination host computer 100 of which hardware resources are available.

Information of the amounts of consumed hardware resources of the host computes 100 and the like is collected from the hypervisors 201 for managing hardware resources of the host computers 100, the agents 340 executed on the OSs executed on the VM guests 320, and the like. The information of the amounts of the consumed hardware resources and the like may not be collected from the hypervisors 201, the agents 340, and the like and may be collected by programs such as firmware executed on the host computers 100 or the OSs executed on the host computers 100.

In the embodiment, the agents 340 are each used to detect whether or not communication is able to be executed between containers executed on the same VM guest 320, for example. Specifically, the agents 340 each monitor whether or not applications executed on multiple containers 330 executed on the same VM guest 320 are able to communicate with each other.

As described above, if the administration manager 300 of the information processing system 10 acquires information on details of a process of an application executed on a container 330 by a user, a problem with security occurs. However, if migration is to be executed due to the maintenance, management, or the like of a host computer 100, and whether or not communication is executed between containers executed on the same VM guest is not recognized, the migration may not be appropriately executed. Specifically, if a hardware resource of a host computer to which a VM is to be migrated is not sufficiently available, and whether or not the communication is executed between the containers is not recognized, the multiple containers executed on the VM may not be appropriately separated from each other and migrated.

From the perspective of security, in the embodiment, whether or not a setting is configured to enable communication to be executed between multiple containers executed on the same VM guest 320 is monitored, while information on processes of the user application programs executed on the containers 330 is not referenced. Specifically, the agents 340 each monitor an argument (for example, the aforementioned "--icc" flag) of a container generation command to be used for the generation of containers 330 on a VM guest 320 in accordance with a request from a user and thereby recognize whether or not the communication is able to be executed between the containers. As another method, the agents 340 each monitor a command to set communication between containers by the aforementioned link function and thereby monitor whether or not the setting is configured to enable the communication to be executed between the containers.

Information that is monitored by the agents 340 and indicates whether or not the setting is configured to enable the communication to be executed between the containers is sufficient to determine whether or not multiple containers to be executed on the same VM guest 320 exist, while whether or not the communication is actually executed between the containers is not detected. Thus, in the embodiment, if containers are to be separated from each other for migration to be executed due to a task of maintaining a host computer 100 or the like, information collected by the agents 340 and related to a setting configured for communication between the containers is referenced and whether or not the containers are able to be separated from each other is determined.

Since multiple containers to be executed on the same VM guest 320 are able to be recognized and migrated to the same destination VM guest 320, the migration is executed without adversely affecting business processes by application programs executed on the containers.

A function of executing communication between containers 330 of container OSs 211 is not used for communication through which applications executed on the containers 330 access an external of a VM guest 320. In this case, even if the VM guest 320 or the containers 330 is or are to be migrated and the containers 330 are separated from each other and migrated to different VM guests 320 or different host computers 100, business processes are not basically adversely affected.

In the virtualization environment illustrated in FIG. 3, however, the network switch 120 is virtualized as the virtual switch 204. Thus, even if communication with an external of a VM guest 320 is executed, a certain container on the VM guest 320 may communicate with another container 330 on the same VM guest 320, depending on assignment states of resources for the VM guest 320 or assignment states of resources for the containers 330. In this situation, if the containers 330 are to be separated and migrated, it is desirable that the containers that communicate with the external be migrated to the same VM guest 320.

From the aforementioned perspective, the agents 340 each monitor whether or not containers 330 executed on a VM guest 320 communicate with an external of the VM guest 320. In this case, the agents 340 do not reference the insides of communication packets transmitted to the external of the VM guest 320, and the agents 340 monitor only whether or not a packet transmitted from a container 330 to the external of the VM guest 320 on which the container 330 is executed exists, secure security for user information, and collect only information to be used for the process of migrating containers 330.

The agents 340 monitor whether or not communication is executed between containers for each of the containers 330 executed on the VM guests 320 (or whether or not settings are configured to enable the communication to be executed between the containers) and whether or not communication with externals of the VM guests 320 is executed. Then, the administration manager 300 recognizes communication states of the containers 330 from the monitor information collected from the agents 340. The administration manager 300 determines, based on the communication states of the containers 330, priorities serving as indices indicating whether or not each of the containers 330 is to be migrated together with another container 330 to the same destination VM guest 320.

FIG. 8 is a diagram illustrating a table indicating the ranking of priorities of containers based on communication states of the containers. The example illustrated in FIG. 8 describes settings of the priorities when a container 1 and a container 2 are executed on the same VM guest.

An item 1 indicates that the container 1 and the container 2 are set so as to execute internal communication between the containers 1 and 2 and execute external communication. In this case, a priority for the communication relationships between the containers 1 and 2 is "high". Since the containers execute the external communication, it is considered that business processes are executed by applications executed on the containers. The containers are set so that the communication is executed between the containers on which the business processes are executed. If the migration is to be executed on the containers, the containers are to be migrated to the same VM guest. Thus, the priority is "high".

An item 2 indicates that the containers 1 and 2 are set so as to execute the internal communication between the containers 1 and 2 and the container 1 is set so as to execute external communication. The container 2 executes only the internal communication with the container 1. However, a business process is executed on the container 1, and the container 1 is set so as to execute the internal communication with the container 2. Thus, a priority for the containers 1 and 2 is "high".

An item 3 indicates that the containers 1 and 2 are set so as to execute external communication and so as not to execute the internal communication between the containers 1 and 2. Thus, the containers 1 and 2 may not be migrated to the same VM guest. The containers 1 and 2, however, may communicate with each other through the virtual switch 204, as described above. It is, therefore, desirable that the containers 1 and 2 be migrated to the same VM guest. Thus, a priority is "middle".

An item 4 indicates that the containers 1 and 2 are set so that the container 1 executes external communication, communication is not executed between the containers 1 and 2, and the container 2 does not execute external communication. Thus, the containers 1 and 2 may not be associated with each other and migrated to the same destination, and a priority is "low".

An item 5 indicates that the containers 1 and 2 are set so as not to execute external communication and so that business processes are not executed on the containers 1 and 2, but communication is able to be executed between the containers 1 and 2. Since a business process may be executed in the future, a priority is "middle". The migration assumed in the embodiment is executed to temporarily migrate VMs or containers due to a failure of a host computer or maintenance of a host computer. Thus, it is considered that even if the containers are set so that communication is able to be executed between the containers, a priority for the containers on which any business process is not executed is "middle", and it is considered that when the execution of a business process is confirmed, the priority is set to be "high".

For example, if the information processing system 10 according to the embodiment is used in order to provide a service in a cloud environment, and a business application is executed on a container, the container executes external communication. When an agent 340 described above monitors the external communication of the container, the priority indicated in the item 5 may be changed from "middle" to "high" by updating information on a communication state of the container to be monitored.

An item 6 indicates that the containers are set so as not to execute external communication and so that communication is not executed between the containers. Thus, containers 1 and 2 may not be associated with each other and migrated to the same VM guest, and a priority is "low".

Figure 9:
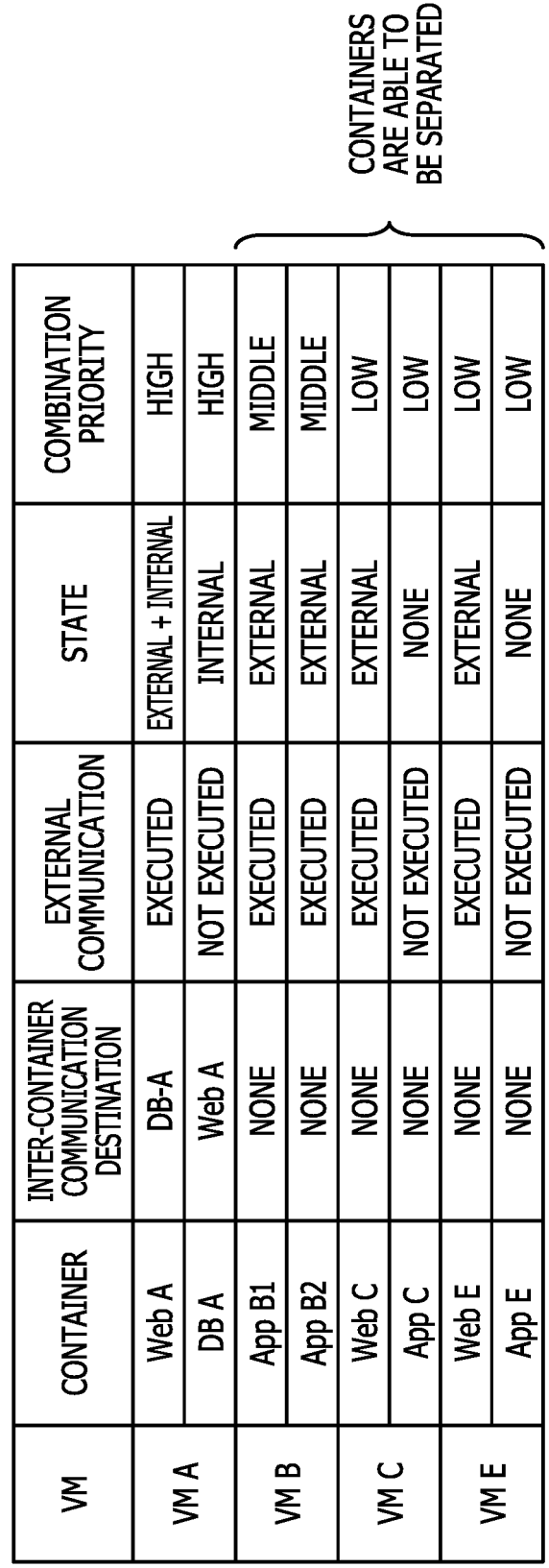
FIG. 9 illustrates a table indicating an example of communication states of containers and an example of the ranking of priorities in an execution example illustrated in FIG. 7.

FIG. 9 is a diagram illustrating a table indicating an example of the communication states of the containers and an example of the ranking of priorities in the execution example illustrated in FIG. 7. According to the communication states indicated by the arrows extending from the containers in the example illustrated in FIG. 7, the containers on which the applications "Web A" and "DB A" are executed on the VM guest 320A are set so that communication is able to be executed between the containers, and the container on which the application "Web A" is executed executes external communication. Thus, a combination priority for a pair of the container on which the application "Web A" indicated in a "container" column of the table illustrated in FIG. 9 is executed and the container on which the application "DB A" indicated in an "inter-container communication destination" column of the table is executed is set to be "high", while the container on which the application "Web A" is executed and the container on which the application "DB A" is executed are set so as to communicate with each other. A combination priority is an index indicating whether or not a pair of containers is to be migrated to and executed on the same virtual machine.

The containers on which the applications "App B1" and "App B2" are executed on the VM guest 320B are set so as to execute external communication and so that communication is not executed between the containers. Thus, a combination priority for the containers on which the applications "App B1" and "App B2" are executed is set to be "middle" based on the table illustrated in FIG. 8.

The two containers on which the applications "Web C" and "App C" are executed on the VM guest 320C are set so that communication is not executed between the containers and that only one of the containers executes external communication. Thus, a combination priority for the two containers is set to be "low". Since communication states of the two containers executed on the VM guest 320E are the same as those of the containers on which the applications "Web C" and "App C" are executed, a combination priority for the containers executed on the VM guest 320E is set to be "low".

As described above, since a pair of containers of which a combination priority is set to be "high" may communicate with each other, the containers are to be migrated to the same destination VM. On the other hand, even if containers of which a combination priority is set to be "middle" or "low" are separated and migrated to different VMs, business processes may be continued and thus the containers of which the combination priority is set to be "middle" or "low" are determined as containers allowed to be separated.

Figure 10:
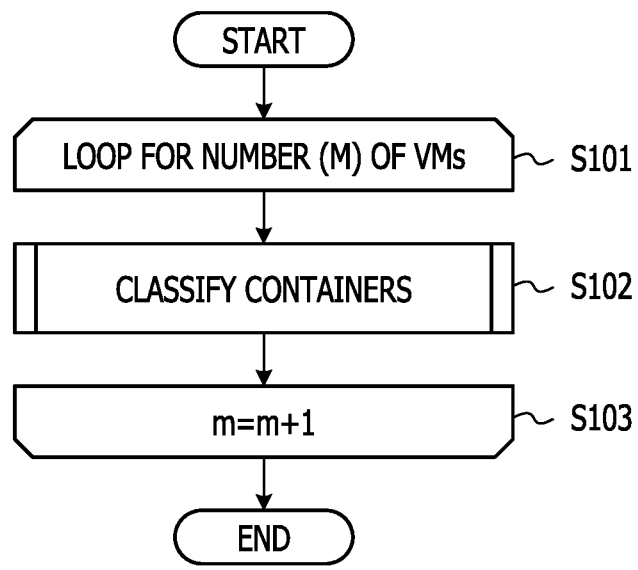
FIG. 10 is an overall flowchart of the ranking of priorities of containers.

FIG. 10 is an overall flowchart of the ranking of priorities of containers. If the number of VM guests 320 to be executed on at least any of the host computers 100 or the number of containers 330 to be executed on at least any of the host computers 100 is changed, or at certain time intervals, combination priorities of containers are determined. In order to determine the combination priorities of the containers, a process of classifying containers is executed for the number (number M, M is a natural number) of VMs (in S102), as illustrated in FIG. 10. Details of the process of classifying containers (in S102) are described with reference to FIGS. 11 and 12.

Figure 11:
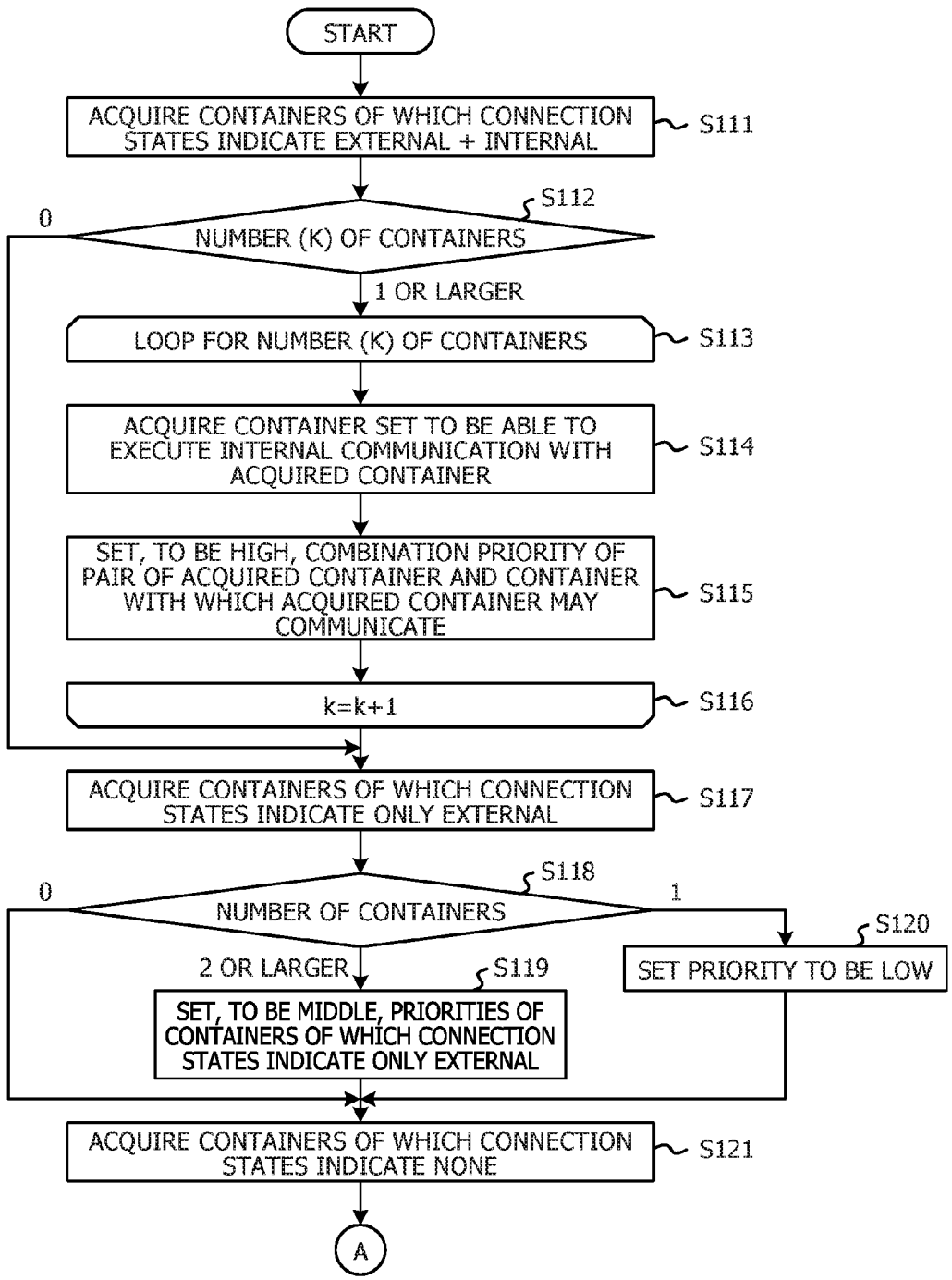
FIG. 11 is a first flowchart of the ranking of the priorities of the containers.
Figure 12:
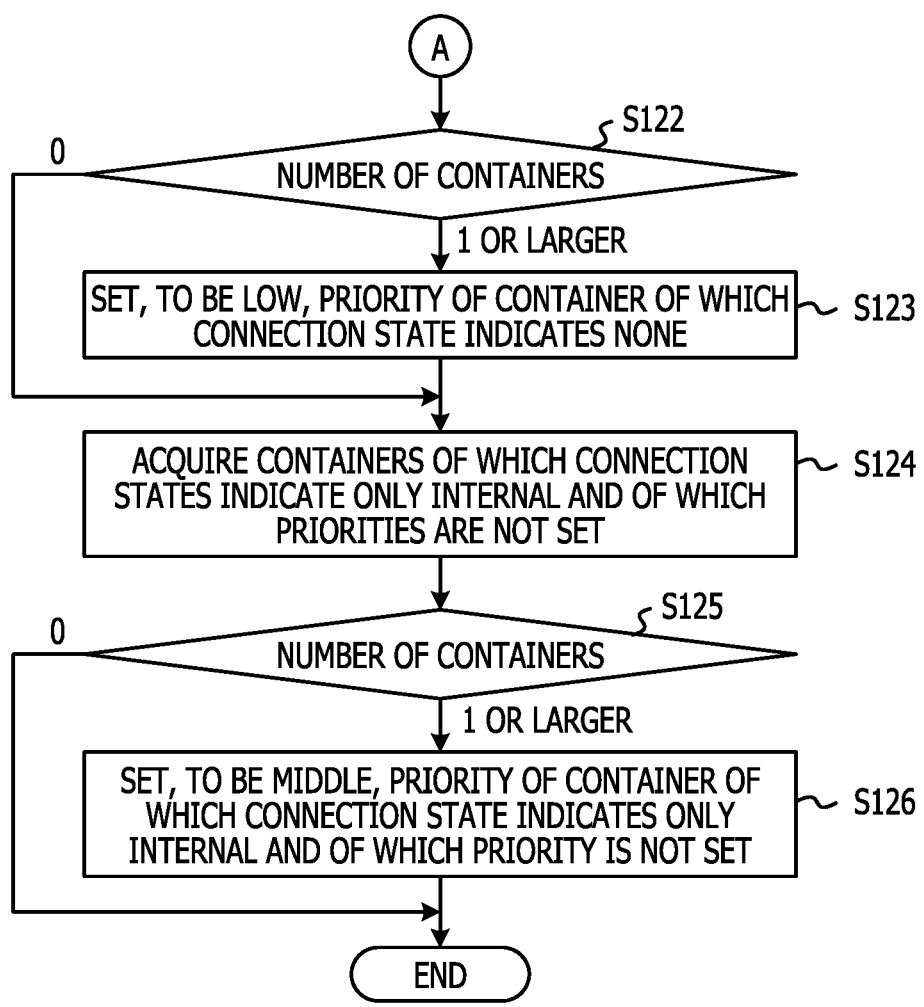
FIG. 12 is a second flowchart of the ranking of the priorities of the containers.

FIGS. 11 and 12 are a flowchart of the ranking of the priorities of the containers. Information of containers that are among containers executed on a VM selected in S101 illustrated in FIG. 10 and of which connection states indicate "external+internal" is acquired (in S111). If the number (number K, K is a natural number) of the acquired containers is 0, the process proceeds to S117. If the number (K) of the acquired containers is 1 or larger, processes of S113 to S116 are executed.

The processes of S113 to S116 are repeated until a variable k (k is a natural number) is changed from 1 to K. Containers that are set to be able to execute internal communication (communication between the containers and at least any of the acquired containers) with at least any of the acquired containers are acquired (in S114). S114 is executed for the number (K) of the containers of which the acquired connection states indicate "external+internal". Then, combination priorities of pairs of the acquired containers and the containers with which the acquired containers execute the internal communication (communication between the containers) are set to be "high" (in S115).

Next, information of containers of which connection states indicate only "external" is acquired (in S117). If the number of the acquired containers of which the connection states indicate only "external" is 0 ("0" in S118), the process proceeds to S121. If the number of the acquired containers of which the connection states indicate only "external" is 1 ("1" in S118), a combination priority of the acquired container is set to be "low" (in S120). If the number of the acquired containers of which the connection states indicate only "external" is 2 or larger ("2 or larger" in S118), combination priorities of the acquired containers are set to be "middle" (in S119).

Next, information of containers of which connection states indicate "none" is acquired (in S121). If the number of the containers of which the acquired connection states indicate "none" is 1 or larger ("1 or larger" in S122), a combination priority of each container of which an acquired connection state indicates "none" is set to be "low" (in S123). On the other hand, if the number of the containers of which the acquired connection states indicate "none" is 0, the process proceeds to S124.

In S124, information of containers of which connection states indicate only "internal" and of which combination priorities are not set is acquired. If the number of the containers acquired in S124 is 1 or larger ("1 or larger" in S125), a combination priority of each container acquired in S124 is set to be "middle" (in S126). If the number of the containers acquired in S124 is 0 ("0" in S125), the process is terminated.

FIG. 13 is a diagram illustrating an example of information acquired by the administration manager from the host computers and indicating usage states of hardware resources in the execution example illustrated in FIG. 7. The example illustrated in FIG. 13 assumes that, as CPU resources of the host computers 100, a CPU resource for a host 1 is 9.0 GHz, a CPU resource for a host 2 is 7.5 GHz, and a CPU resource for a host 3 is 11.5 GHz. This example assumes that "GHz" that is a unit of the CPU resources indicates the numbers of process steps of programs enabling processes to be executed using the CPUs 101 in each of the hosts per unit time. In addition, the example assumes that "GHz" that is illustrated in FIG. 13 as a unit of CPU utilization indicates the numbers of process steps of the CPUs 101 used per unit time by application programs executed on the CPUs 101.

As is apparent from FIG. 13, the total of CPU utilization of application programs executed on containers of the host 1 is 7.0 GHz, and an available CPU resource for the host 1 is 2.0 GHz. The total of CPU utilization of application programs executed on VMs or containers of the host 2 is 4.0 GHz, and an available CPU resource for the host 2 is 3.5 GHz. In addition, the total of CPU utilization of application programs executed on VMs of the host 3 is 8.0 GHz, and an available CPU resource for the host 3 is 3.5 GHz. The names of application programs executed on VMs "VM D", "VM F", and "VM G" are not illustrated in FIG. 13, but the example illustrated in FIG. 13 assumes that application programs are executed on the VMs "VM D", "VM F", and "VM G".

FIGS. 14A and 14B are first diagrams describing an example of the simulation of the migration of virtual machines or containers in the execution example illustrated in FIG. 13. FIG. 14A assumes a case where VMs or containers executed on the host computer 100A (host 1) are to be migrated to the other host computers, for example. In this case, if the aforementioned live migration is able to be executed, the VMs or the containers are able to be migrated to the other host computers in a state in which the VMs are executed. Thus, whether or not the VMs are able to be migrated on a VM basis is determined.

For example, in the example illustrated in FIG. 14A, "VM B" is migrated to the host 3 by the live migration, and "VM C" is migrated to the host 2 by the live migration. Then, the available CPU resource for the host 2 becomes 0.5 GHz and the available CPU resource for the host 3 becomes 1.3 GHz, as illustrated in FIG. 14B. In this case, the available CPU resources for the host computers to which "VM A" that remains in the host 1 is to be migrated are lower than 1.8 GHz that is CPU utilization of "VM A", and thus the "VM A" is not migrated by the live migration.

Thus, the VMs executed on the host 1 are not migrated by the live migration to another host computer in the example illustrated in FIGS. 14A and 14B, and thus whether or not the containers executed on the VMs are able to be separated and migrated by the live migration is determined, as illustrated in FIGS. 15A to 15C.

FIGS. 15A, 15B, and 15C are second diagrams describing the simulation to be executed to determine whether or not the virtual machines or containers are able to be migrated in the execution example illustrated in FIG. 13. As illustrated in FIGS. 14A and 14B, since the VMs of the host 1 are not migrated by the live migration on a VM basis, whether or not available resource amounts of the destination host computers to which the containers are to be migrated are secured by separating the containers executed on the VMs is determined.

In a case illustrated in FIG. 15A, it is considered that the two containers that are among the containers executed on the VMs of the host 1 and are executed on "VM C" of which the combination priorities illustrated in FIG. 9 are low are separated from each other and migrated to the hosts 2 and 3. For example, a container that is among the containers executed on "VM C" and on which "Web C" is executed is migrated to a virtual machine "VM H" newly generated on the host 3, and "VM C" on which only "App C" is executed is migrated to the host 2 by the live migration. Then, the available CPU resource for the host 2 becomes 1.7 GHz, and the available CPU resource for the host 3 becomes 2.3 GHz, as illustrated in FIG. 15B.

In a case illustrated in FIG. 15B, it is considered that two containers that are executed on "VM B" and able to be separated from each other and of which a combination priority is "middle" are to be separated from each other. For example, the container on which "App B1" is executed and that is among the containers executed on "VM B" is migrated to a virtual machine "VM I" newly generated on the host 3, and "VM B" on which only "App B2" is executed is migrated to the host 2 by the live migration. Then, the available CPU resource for the host 2 becomes 0 GHz and the available CPU resource for the host 3 becomes 1.8 GHz, as illustrated in FIG. 15C.

Since the two containers executed on "VM A" are set to be able communicate with each other, and a combination priority of the two containers is "high", the containers are not separated from each other and migrated. As illustrated in FIGS. 15A and 15B, however, since the containers executed on "VM B" are separated from each other and migrated and the containers executed on "VM C" are separated from each other and migrated, "VM A" of which CPU utilization is 1.8 GHz may be migrated to the host 3 by the live migration.

It is apparent from the simulation illustrated in FIGS. 15A to 15C that the VMs or containers executed on the host 1 may be migrated to the other host computers. Since "VM H" and "VM I" that are new VMs to which the separated containers are migrated are generated in the simulation illustrated in FIGS. 15A to 15C, the number of VMs to be newly generated for the migration executed on the source host 1 is 2.

The simulation illustrated in FIGS. 15A to 15C is executed on the hosts 2 and 3 in the same manner as the simulation executed on the host 1. Specifically, if tasks of maintaining the host computers 100B and 100C are performed, whether or not the VMs or containers executed on the host 2 are able to be migrated to the other host computers and whether or not the VMs or containers executed on the host 3 are able to be migrated to the other host computers are simulated. In the simulation executed on the host 2, "VM D" may be migrated to the host 3 by the live migration and "VM E" may be migrated to the host 1 by the live migration. Thus, the containers may not be separated for the migration and the number of VMs to be newly generated for the migration is 0.

In simulation executed on the host 3, "VM G" of which CPU utilization is 3.5 GHz may be migrated by the live migration to the host 2 having the available CPU resource of 3.5 GHz. However, since the available CPU resource for the host 1 is lower than 4.5 GHz that is CPU utilization of remaining "VM F", not all the VMs executed on the host 3 are migrated. In this case, information that indicates that the available resources are not sufficient for the migration to be executed on the host 3 is notified to an administrator of the information processing system 10, and a host computer or a hardware resource for an existing host computer is added by the administrator.

Figure 16:
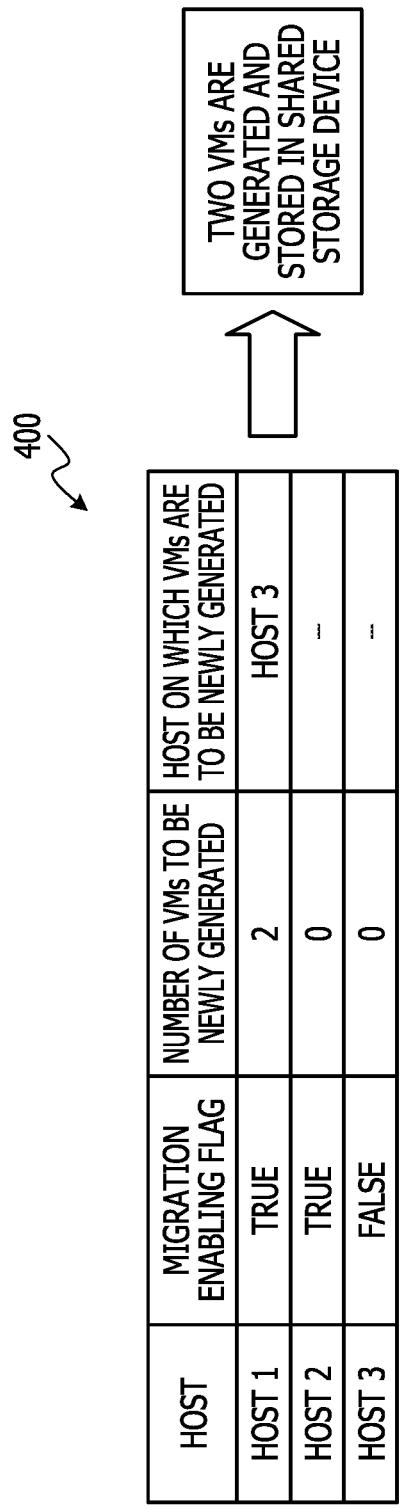
FIG. 16 illustrates a list of results of the simulation of the migration of the virtual machines or containers in the execution example illustrated in FIG. 13.

FIG. 16 is a diagram illustrating a list 400 of results of the simulation of the migration of the virtual machines or containers in the execution example illustrated in FIG. 13. As a result of the simulation executed on the hosts and illustrated in FIGS. 15A to 15C, if all VMs or containers executed on a host are able to be migrated, a migration enabling flag for the host indicates "true". For example, if not all the VMs ("VM F" and "VM G") executed on the host 3 are able to be migrated to the other hosts, a migration enabling flag for the host 3 indicates "false". In the simulation executed on the host 1 and described with reference to FIGS. 15A to 15C, "VM H" and "VM I" are newly generated on the host 3. Thus, the list 400 illustrated in FIG. 16 indicates that the "number of VMs to be newly generated" for the host 1 is 2 and that a "destination host on which the VMs are to be newly generated" indicates the "host 3".

As described above, if containers are separated and migrated, a part of the separated containers and a VM on which the part of the separated containers is executed may be migrated by the live migration, and the remaining part of the separated containers may not be migrated by the live migration. In this case, a VM to which the remaining part of the separated containers is to be migrated may be newly generated on another host, a container OS may be activated on the newly generated VM, and the remaining part may be migrated to the newly generated VM.

A situation in which multiple hosts simultaneously fail and VMs or containers executed on the multiple hosts are to be migrated is considered to be very rare. Thus, VMs of which the number (2 in the example illustrated in FIG. 16) is the maximum number among numbers recorded in a column for the "numbers of VMs to be newly generated" in the list 400 of the results of the simulation are generated, and data of the generated VMs is stored in the storage device 110 shared by the hosts 310. In this case, the data may be stored, while container OSs are activated on the generated VMs. If containers executed on any of the hosts 310 are to be separated and migrated, the containers may be migrated using a VM held in the storage device 110 within a short time period in which business processes are not adversely affected. As a method of storing the generated VMs, the VMs may be stored by a so-called hot standby method or a so-called cold standby method. The information within the list 400 illustrated in FIG. 16 may be held in a storage region on the memory 133 of the managing server 130 or held in a storage region on the storage device 110.

In the list 400 illustrated in FIG. 16, the migration enabling flag for the host 3 indicates "false". If hardware of the host 3 or the like fails, the migration may not be appropriately executed. Thus, if a host for which a migration enabling flag indicates "false" in the list 400 of the results of the simulation exists, the administration manager 300 notifies the administrator of the system that the host on which the migration is not appropriately executed exists. The administrator adds a hardware resource or the like due to deficiency of the hardware resource based on the notification from the administration manager 300.

Figure 17:
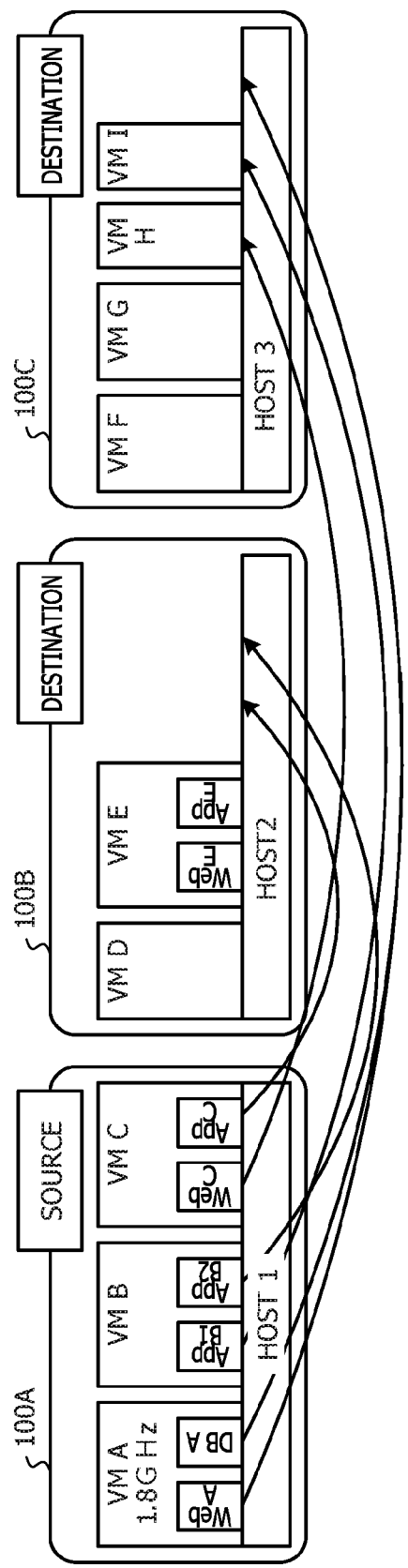
FIG. 17 illustrates an example of a process executed when the virtual machines or containers on a host are to be migrated in the execution example illustrated in FIG. 13.

FIG. 17 is a diagram illustrating an example of a process to be executed when the virtual machines or containers on the host 1 are to be migrated in the execution example illustrated in FIG. 13. In the host 3 illustrated in FIG. 17, "VM H" and "VM I" on which the container OSs are activated are prepared on the host 3 in advance based on the list 400 illustrated in FIG. 16 and indicating the results of the simulation. Thus, even if the migration is to be immediately executed due to a failure of hardware of the host 1 or due to the maintenance and inspection of the host 1, the migration may be executed within a short time period without stopping business processes by the applications executed on the containers on the host 1.

A flowchart of the simulation that is described with reference to FIGS. 14A to 16 and is executed by the administration manager 300 to determine whether or not VMs or containers executed on each of the host computers are able to be migrated is described with reference to FIGS. 18 to 24. If the number of VM guests 320 or containers 330 executed on a host computer 100 included in the information processing system 10 is changed, or at certain time intervals, the administration manager 300 determines whether or not the migration is able to be executed, as described with reference to FIGS. 18 to 24. If a host on which a VM is to be newly activated exists as a result of the determination in the simulation, the VM is activated on the host. In addition, if a host on which the migration is not able to be executed due to deficiency of a hardware resource exists, the administration manager 300 notifies the administrator of the system that the hardware resource is to be added.

A process of determining, by the administration manager 300, whether or not the migration is able to be executed is illustrated in FIGS. 18 to 24 and executed by the CPU 131 of the managing server 130 using the programs and data stored in the memory 133 and the monitor information collected from the host computers.

Figure 18:
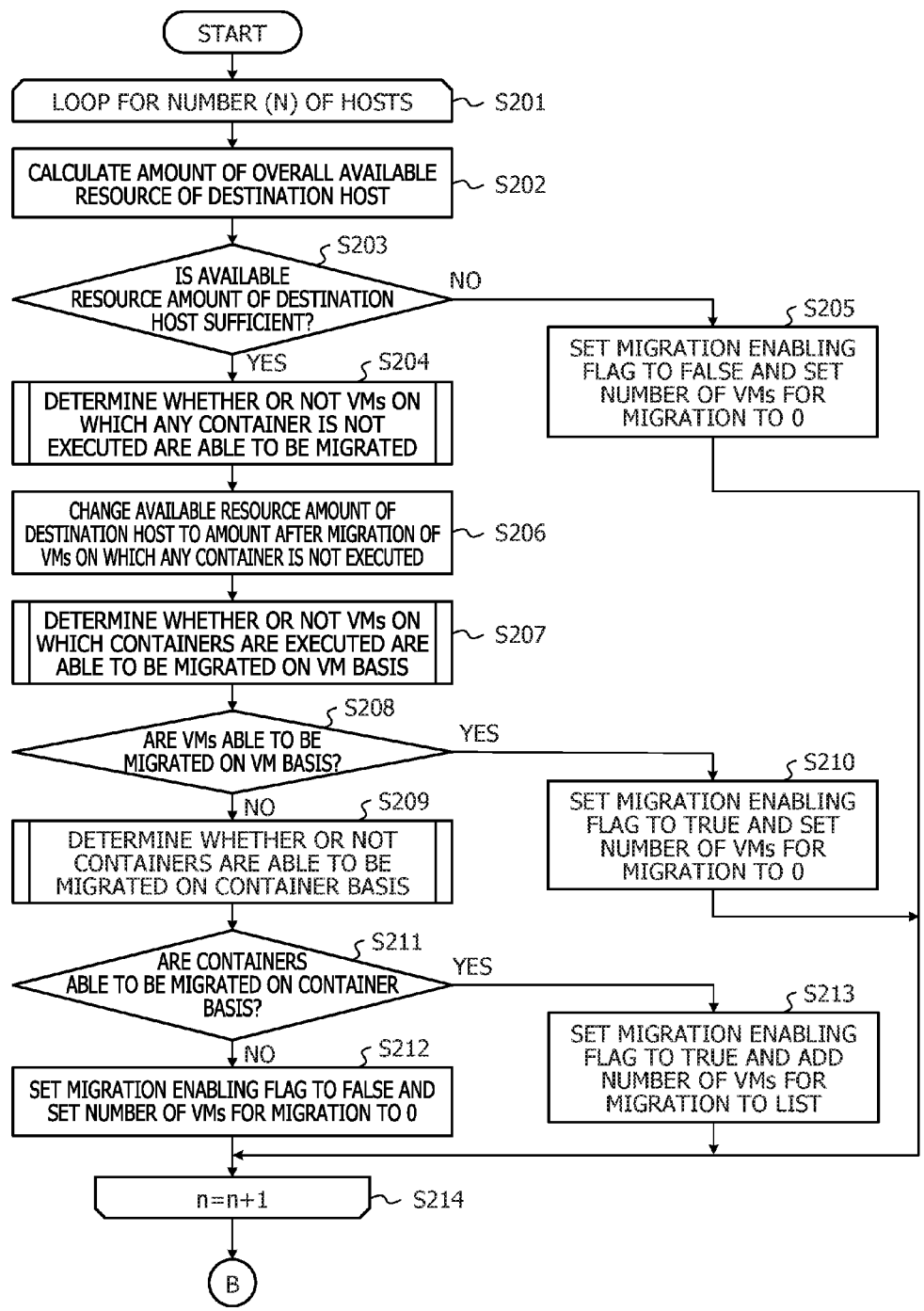
FIG. 18 is a flowchart of the first half of an overall process of determining whether or not migration is able to be executed according to the embodiment.
Figure 19:
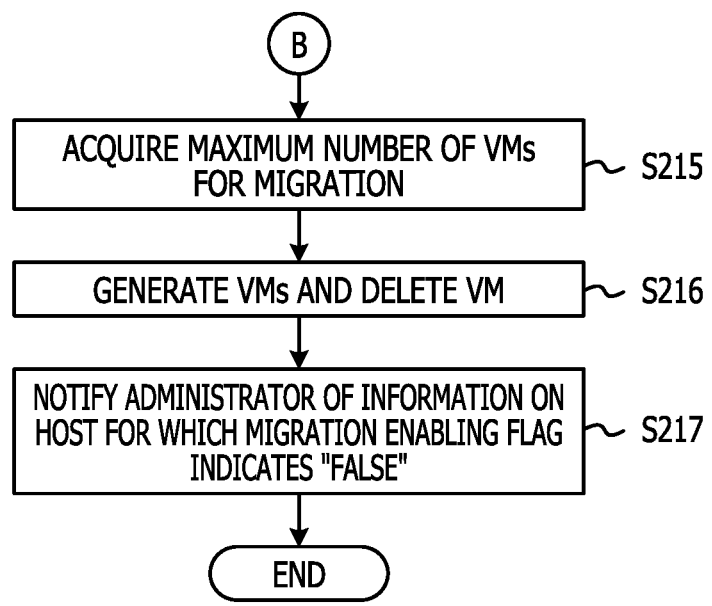
FIG. 19 is a flowchart of the second half of the overall process of determining whether or not the migration is able to be executed according to the embodiment.

FIGS. 18 and 19 are a flowchart of an overall process of determining whether or not the migration is able to be executed according to the embodiment. First, whether or not VMs or containers executed on the hosts of the host computers 100 (hereinafter merely referred to as "hosts" in some cases) included in the information processing system 10 are to be migrated is determined (in S201 to S214).

In the above description using FIGS. 14 to 16, attention is paid to the resources of the CPUs 101 as hardware of the host computers 100 in order to simplify the description. However, since not only the CPU resources but also memory resources to be used by application programs are actually to be considered, it is desirable that whether or not the migration is able to be executed be determined in consideration of not only the resources of the CPUs 101 but also the resources of the memory 103. Hereinafter, hardware resources such as the CPU resources and the memory resources are merely referred to as "resources" in some cases.

In a process illustrated in FIG. 18, the number of the hosts is N (N is a natural number), and processes of S201 to S214 are repeated until a variable n (n is a natural number) is changed from 1 to N. First, a first host (n=1) to be subjected to the process of determining whether or not the migration is able to be executed is identified (in S201), and the amount of an overall available resource of a host that is not the identified host and is a migration destination is calculated (in S202). If the amount of the overall available resource of the host that is the destination is not sufficient (No in S203), a migration enabling flag for the identified host is set to "false", and the numbers of VMs to be newly generated for the migration of containers or the like are set to 0 (in S205). Then, the process proceeds to S214.

If the amount of the overall available resource of the host that is the destination is sufficient (Yes in S203), whether or not VMs on which any container is not executed are able to be migrated is determined in a subroutine S204. Details of a process of the subroutine S204 are described with reference to FIG. 20.

Figure 20:
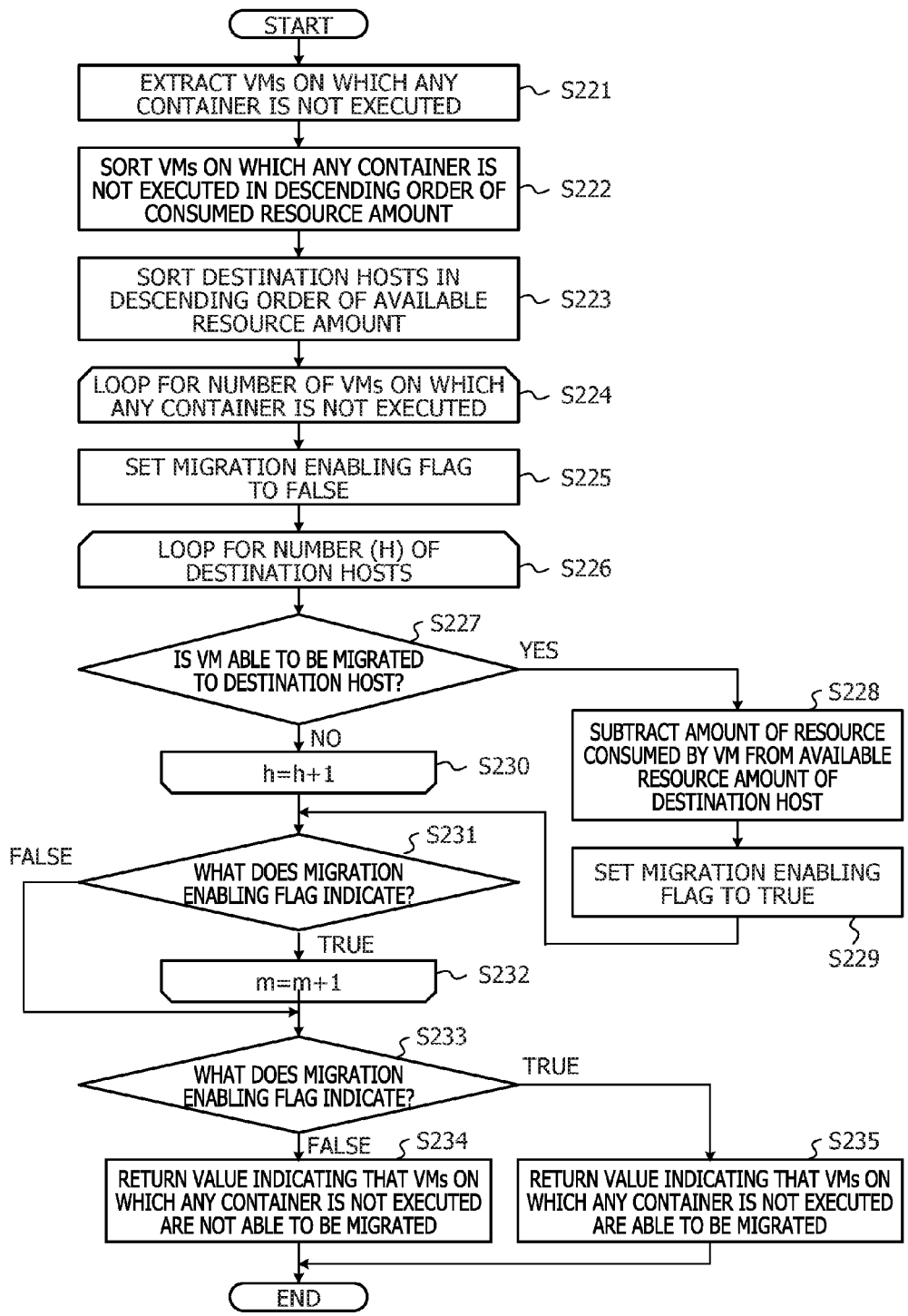
FIG. 20 is a flowchart of a subroutine process of determining whether or not VMs on which any container is not executed are able to be migrated.

FIG. 20 is a flowchart of the subroutine process of determining whether or not the VMs on which any container is not executed are able to be migrated in S204.

First, the VMs on which any container is not executed are extracted from VMs executed on the target host (in S221). The VMs that are extracted in S221 and on which any container is not executed are sorted in descending order of consumed resource amount (in S222). Next, hosts that are destination candidates to which the VMs may be migrated are sorted in descending order of available resource amount (in S223).

The number of the VMs that are extracted in S221 and on which any container is not executed is M (M is a natural number, hereinafter the same applies). The VMs extracted in S221 are selected in the order sorted in S222 until a variable m (m is a natural number, hereinafter the same applies) is changed from 1 to M, and processes of S224 to S232 are executed on the selected VMs. Before whether or not the VMs selected in S224 are able to be migrated is determined, the migration enabling flag for the host (selected in S201) to be subjected to the determination is set to "false" (in S225). The number of hosts that are the destination candidates of the VMs is H (H is a natural number, hereinafter the same applies). The hosts that are the destination candidates are selected in the order sorted in S223 until a variable h (h is a natural number, hereinafter the same applies) is changed from 1 to H, and processes of S226 to S230 are executed on the selected hosts.

If a VM selected in S224 is able to be migrated on a VM basis to a host that is selected in S226 and is a destination host candidate (Yes in S227), the amount of a resource consumed by the VM selected in S224 is subtracted from an available resource amount of the selected destination host (in S228). Next, a migration enabling flag for the host to be subjected to the determination is set to "true" (in S229), and the process exits a loop of S226 to S230.

If the VM selected in S224 is not able to be migrated on a VM basis to the host that is selected in S226 and is the destination host candidate (No in S227), the destination host candidate is changed to another destination host candidate (in S230), and whether or not the VM selected in S224 is able to be migrated to the other destination host candidate on a VM basis is determined again (in S227). If the VM is able to be migrated to any of the destination host candidates, the processes of S228 and S229 are executed and the process exits the loop of S226 to S230 in a state in which the migration enabling flag indicates "true". On the other hand, if the VM is not able to be migrated to any of the destination host candidates, the process exits the loop of S226 to S230 in a state in which migration enabling flag indicates "false".

After the process exits the loop of S226 to S230, the state of the migration enabling flag is determined (in S231). If the migration enabling flag indicates "true" as a result of the determination of whether or not the VM selected in S224 is able to be migrated ("true" in S231), the value m is updated (in S232) and the processes of S225 to S231 are repeatedly executed on the next VM. If at least one of the VMs on which any container is not executed is not able to be migrated to any of the destination host candidates, the determination of whether or not another VM is able to be migrated is meaningless. Thus, if the migration enabling flag indicates "false" in the determination of S231, the process exits a loop of S224 to S232.

Then, the migration enabling flag is determined again (in S233). If the migration enabling flag indicates "true" in the determination of S233, a value that indicates that the VMs on which any container is not executed are able to be migrated is returned as a return value of the subroutine S204 (in S235). On the other hand, if the migration enabling flag indicates "false" in the determination of S233, a value that indicates that the VMs on which any container is not executed are not able to be migrated is returned as a return value of the subroutine S204 (in S234). In the process of the flowchart illustrated in FIG. 18, if the return values of the subroutine S204 that are returned in S234 and S235 are not used, the processes of S233 to S235 may be omitted.

Returning to FIG. 18, and the process is described from S206 illustrated in FIG. 18. Among values of available resource amounts of the destination host candidates after whether or not the VMs on which any container is not executed are able to be migrated is determined, a value of an available resource amount of a host that is a destination candidate is updated in the determination process illustrated in FIG. 18 (in S206). If a variable that is updated in S229 of the subroutine S204 and is provided for the available resource amount of the destination host is equal to a variable that is used in S202, S203, and S206 illustrated in FIG. 18 and is provided for the available resource amount of the destination host, the process of S206 may be omitted.

Next, whether or not VMs on which containers are executed are able to be migrated on a VM basis is determined by a subroutine S207. Details of a process of the subroutine S207 are described with reference to FIG. 21.

Figure 21:
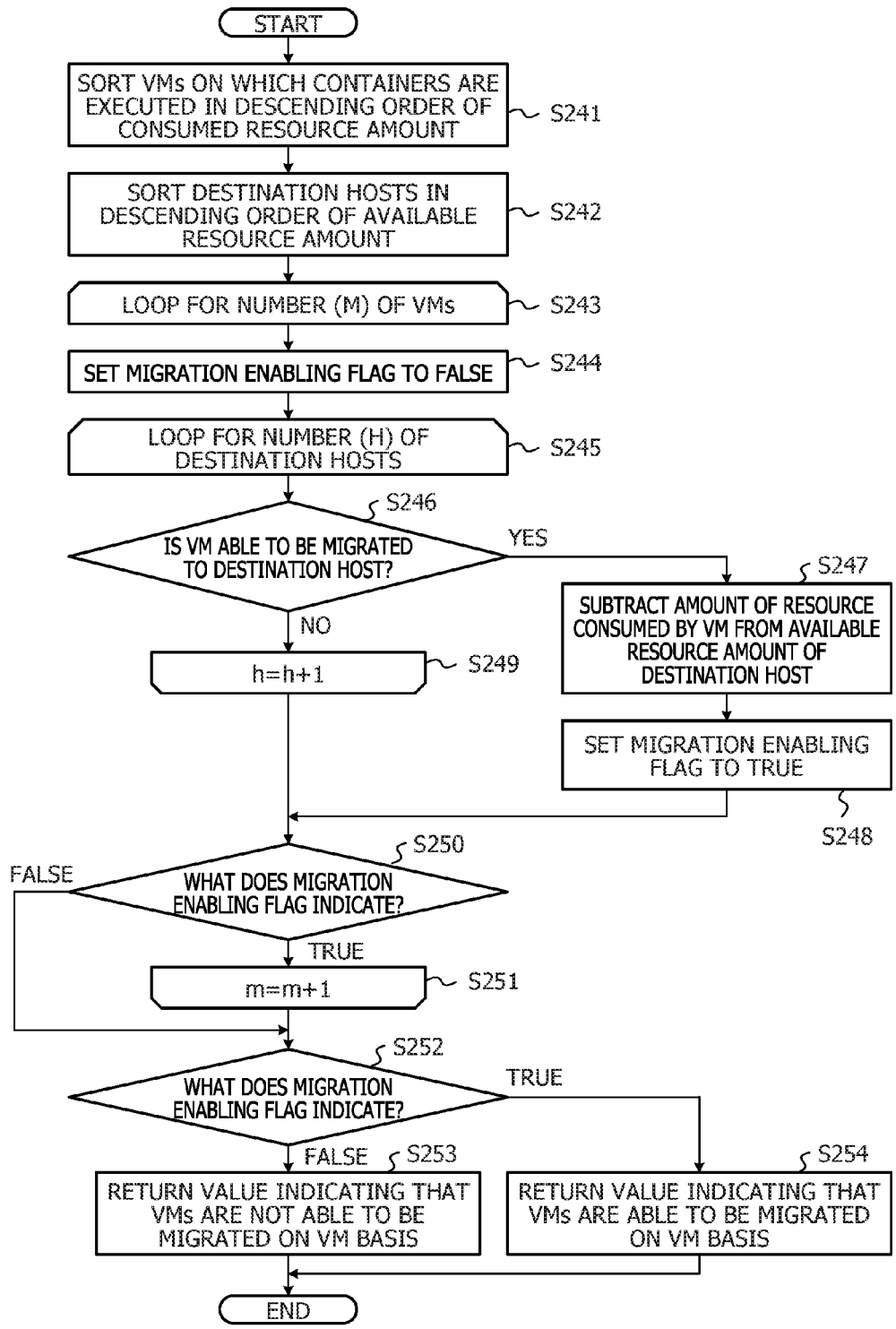
FIG. 21 is a flowchart of a subroutine process of determining whether or not all VMs on which containers are executed in host computers are able to be migrated on a VM basis.

FIG. 21 is a flowchart of the process of the subroutine S207 for determining whether or not all the VMs on which the containers are executed are able to be migrated. First, all VMs that are executed on the host to be subjected to the determination and on which containers are executed are sorted in descending order of consumed resource amount (in S241). Next, the hosts that are the destination candidates are sorted in descending order of available resource amount (in S242).

The number of the VMs on which the containers are executed in the host to be subjected to the determination is M. The VMs that are executed on the host to be subjected to the determination and on which the containers are executed are selected in the order sorted in S241 until a variable m is changed from 1 to M, and processes of S243 to S251 are executed on the selected VMs. Before whether or not the VMs selected in S243 are able to be migrated is determined, a migration enabling flag for the host to be subjected to the determination is set to "false" (in S244). The number of the hosts that are the destination candidates of the VMs is H. Then, the hosts that are the destination candidates are selected in the order sorted in S242 until a variable h is changed from 1 to H, and the processes of S245 to S249 are executed on the selected hosts.

If a VM selected in S243 is able to be migrated on a VM basis to a destination host candidate selected in S245 (Yes in S246), the amount of a resource consumed by the VM selected in S243 is subtracted from an available resource amount of the selected destination host (in S247). Next, a migration enabling flag for the host to be subjected to the determination is set to "true" (in S248), and the process exists a loop of S245 to S249.

If the VM selected in S243 is not able to be migrated on a VM basis to the destination host candidate selected in S245 (No in S246), the destination host candidate is changed to another destination host candidate (in S249) and whether or not the VM reselected in S243 is able to be migrated to the other destination host candidate on a VM basis is determined (in S246). If the VM is able to be migrated to any of the destination host candidates, the processes of S247 and S248 are executed and the process exits the loop of S245 to S249 in a state in which the migration enabling flag indicates "true". On the other hand, if the VM is not able to be migrated to any of the destination host candidates, the process exits the loop of S245 to S249 in a state in which the migration enabling flag indicates "false".

After the process exits the loop of S245 to S249, the state of the migration enabling flag is determined (in S250). If the migration enabling flag indicates "true" as a result of the determination of whether or not the VM selected in S243 is able to be migrated ("true" in S250), the value m is updated (in S251) and the processes of S244 to S250 are repeatedly executed on the next VM. If at least one VM that is not able to be migrated to any of the destination host candidates and is among the VMs on which the containers are executed exists, the determination of whether or not another VM is able to be migrated is meaningless. Thus, if the migration enabling flag indicates "false" as a result of the determination of S250, the process exits a loop of S243 to S251.

After the process exits the loop of S243 to S251, the migration enabling flag is determined again (in S252). If the migration enabling flag indicates "true" in the determination of S252, a value that indicates that the VMs on which the containers are executed are able to be migrated on a VM basis is returned as a return value of the subroutine S207 (in S254). On the other hand, if the migration enabling flag indicates "false" in the determination of S252, a value that indicates that the VMs on which the containers are executed are not able to be migrated on a VM basis is returned as a return value of the subroutine S207 (in S253). In the process of the flowchart illustrated in FIG. 18, if the return values of the subroutine S207 are not used in S253 and S254, the processes of S252 to S254 may be omitted.

The process is described below from S208 illustrated in FIG. 18. If all the VMs on which the containers are executed are able to be migrated on a VM basis by the subroutine S207 (Yes in S208), the migration enabling flag is set to "true". Then, the number of VMs for the migration or the number of VMs to be newly generated for the migration of containers is set to 0 (in S210) and the process proceeds to S214. On the other hand, if not all the VMs on which the containers are executed are able to be migrated on a VM basis (No in S208), whether or not the containers are able to be migrated on a container basis is determined in a subroutine S209. Details of a process of the subroutine S209 are described with reference to FIGS. 22 and 23.

Figure 22:
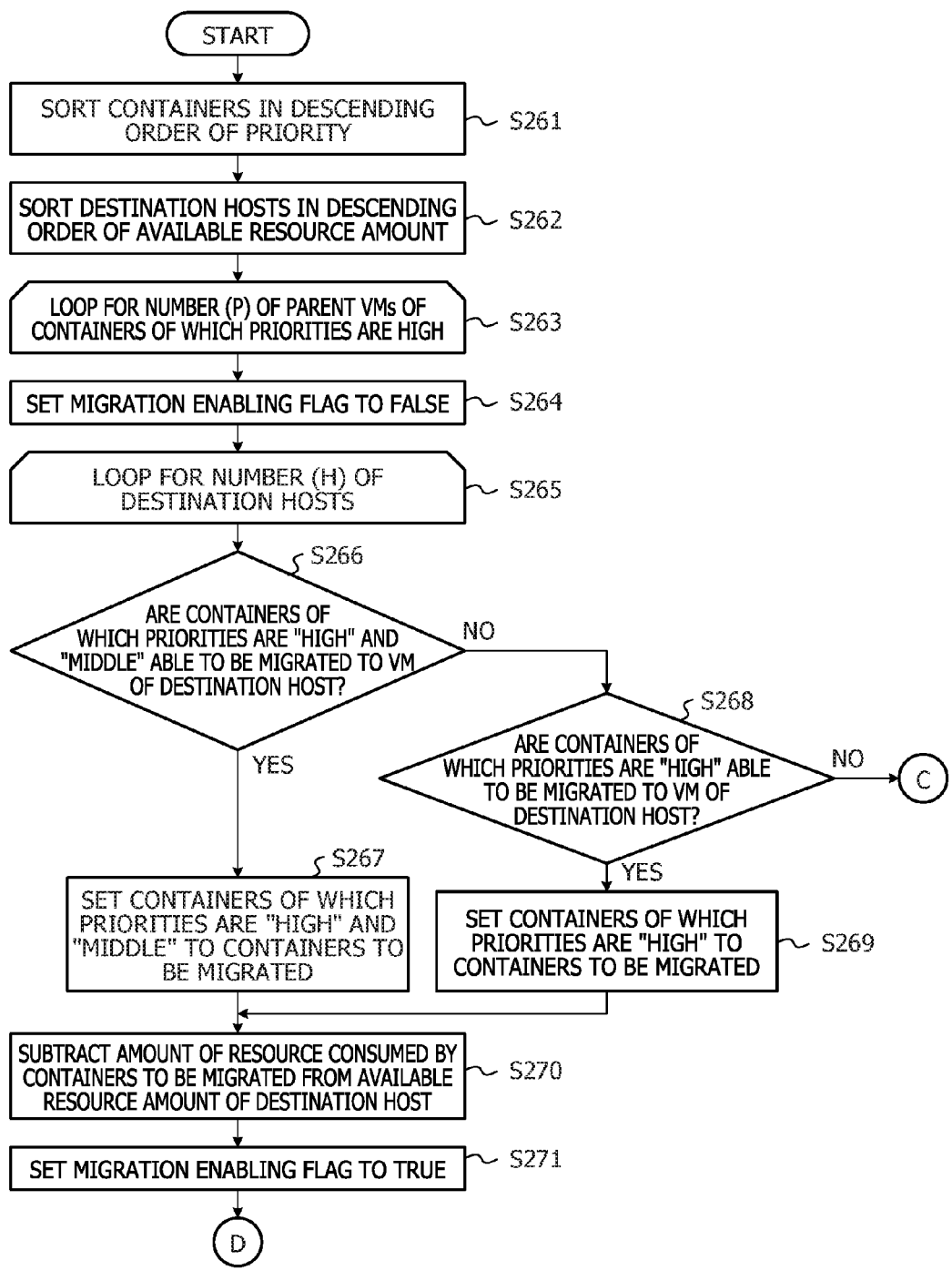
FIG. 22 illustrates the first half of a flowchart of a subroutine process of determining whether or not containers that each have a high priority and are executed in the host computers are able to be migrated.
Figure 23:
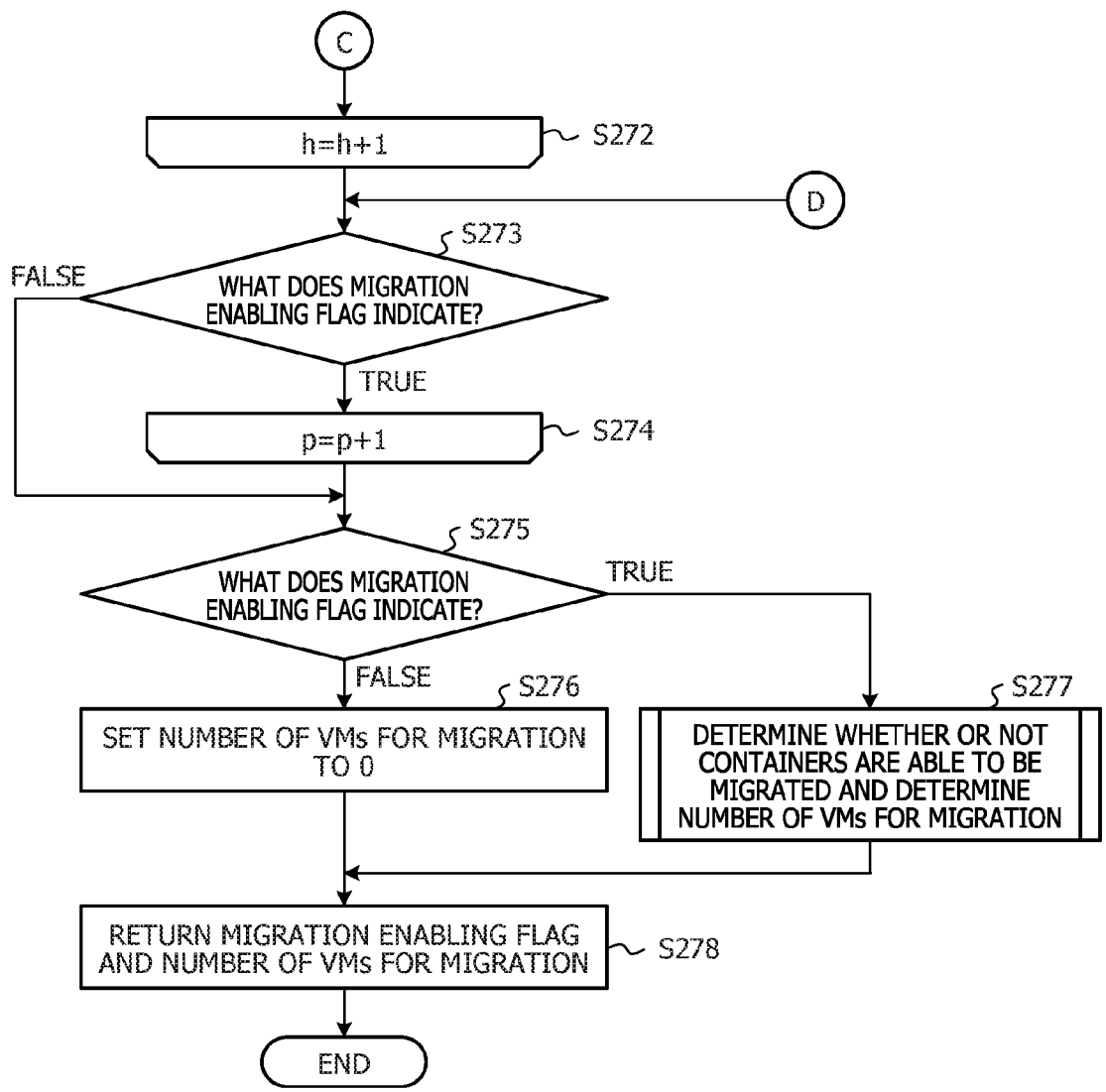
FIG. 23 is illustrates the second half of the flowchart of the subroutine process of determining whether or not the containers that each have the high priority and are executed in the host computers are able to be migrated.

FIGS. 22 and 23 are a flowchart of the process of the subroutine S209 for determining whether or not containers that are executed on a host computer and of which combination priorities are high are able to be migrated. In the following description of FIGS. 22 and 23, "combination priorities" are merely referred to as "priorities". First, containers executed on the VMs within the host to be subjected to the determination are sorted in descending order of priority (in S261). Next, the hosts that are the destination candidates are sorted in descending order of available resource amount (in S262).

The containers sorted in descending order of priority in S261 are referenced and parent VMs that include containers of which priorities are high are extracted. Each "parent VM" is a VM on which a target container is executed. If the number of the extracted parent VMs is P (P is a natural number), the parent VMs are selected one by one until a variable p (p is a natural number) is changed from 1 to P, and processes of S263 to S274 are executed on the selected parent VMs. Before whether or not containers that are included in a VM selected in S263 and of which priorities are high are able to be migrated is determined, the migration enabling flag for the host to be subjected to the determination is set to "false" (in S264).

The number of the hosts that are the destination candidates to which the VMs may be migrated is H. The hosts that are the destination candidates are selected in the order sorted in S262 until the variable h is changed from 1 to H, and processes of S265 to S272 are executed on the selected hosts.

If all the containers that are included in the parent VM selected in S263 and of which priorities are "high", and all containers that are included in the parent VM selected in S263 and of which priorities are "middle", are able to be migrated together to a destination host candidate selected in S265 (Yes in S266), the containers of which the priorities are "high" and "middle" are set to containers to be migrated (in S267). On the other hand, if the containers of which the priorities are "high" and "middle" are not able to be migrated to the destination host candidate selected in S265 (No in S266), the process proceeds to S268.

In S268, whether or not all the containers of which the priorities are "high" are able to be migrated together to the destination host candidate selected in S265 is determined. If all the containers of which the priorities are "high" are able to be migrated together to the destination host candidate (Yes in S268), the containers of which the priorities are "high" are set to containers to be migrated (in S269). On the other hand, if all the containers of which the priorities are "high" are not able to be migrated together to the destination host candidate (No in S268), the process proceeds to S272 through a connector C. Then, the variable h is updated, the next destination host candidate is selected in S265, and the processes of S265 to S272 are executed.

If containers to be migrated are set in S267 or S269, the amount of a resource consumed by the containers to be migrated is subtracted from an available resource amount of the destination host candidate selected in S265 (in S270). Then, the migration enabling flag for the host to be subjected to the determination is set to "true" (in S271), and the process exits a loop of S265 to S272 through a connector D.

If all the containers that are included in the parent VM selected in S263 and of which the priorities are "high" are not able to be migrated together to any of the destination host candidates selected in S265, the process exits the loop of S265 to S272 in a state in which the migration enabling flag indicates "false".

After the process exits the loop of S265 to S272, the state of the migration enabling flag is determined (in S273). If the migration enabling flag indicates "true" in S273, the value p is updated (in S274) and the processes of S264 to S273 are repeatedly executed on the next parent VM. If the migration enabling flag indicates "false", the determination to be made on another parent VM in the processes of S264 to S273 is meaningless, and thus the process exits a loop of the S263 to S274.

After the process exits the loop of S263 to S274, the migration enabling flag is determined again (in S275). If the migration enabling flag indicates "false" in the determination of S275, the number of VMs for the migration or the number of VMs to be newly generated for the migration of containers is set to 0 (in S276). Then, the migration enabling flag and the number (0 in this case) of VMs to be newly generated are returned as return values of the subroutine S209 (in S278).

If the migration enabling flag indicates "true" in the determination of S275, whether or not remaining containers that are not set to containers to be migrated in S267 or S269 are able to be migrated is determined in a subroutine S277. Details of a process of the subroutine S277 are described with reference to FIG. 24.

Figure 24:
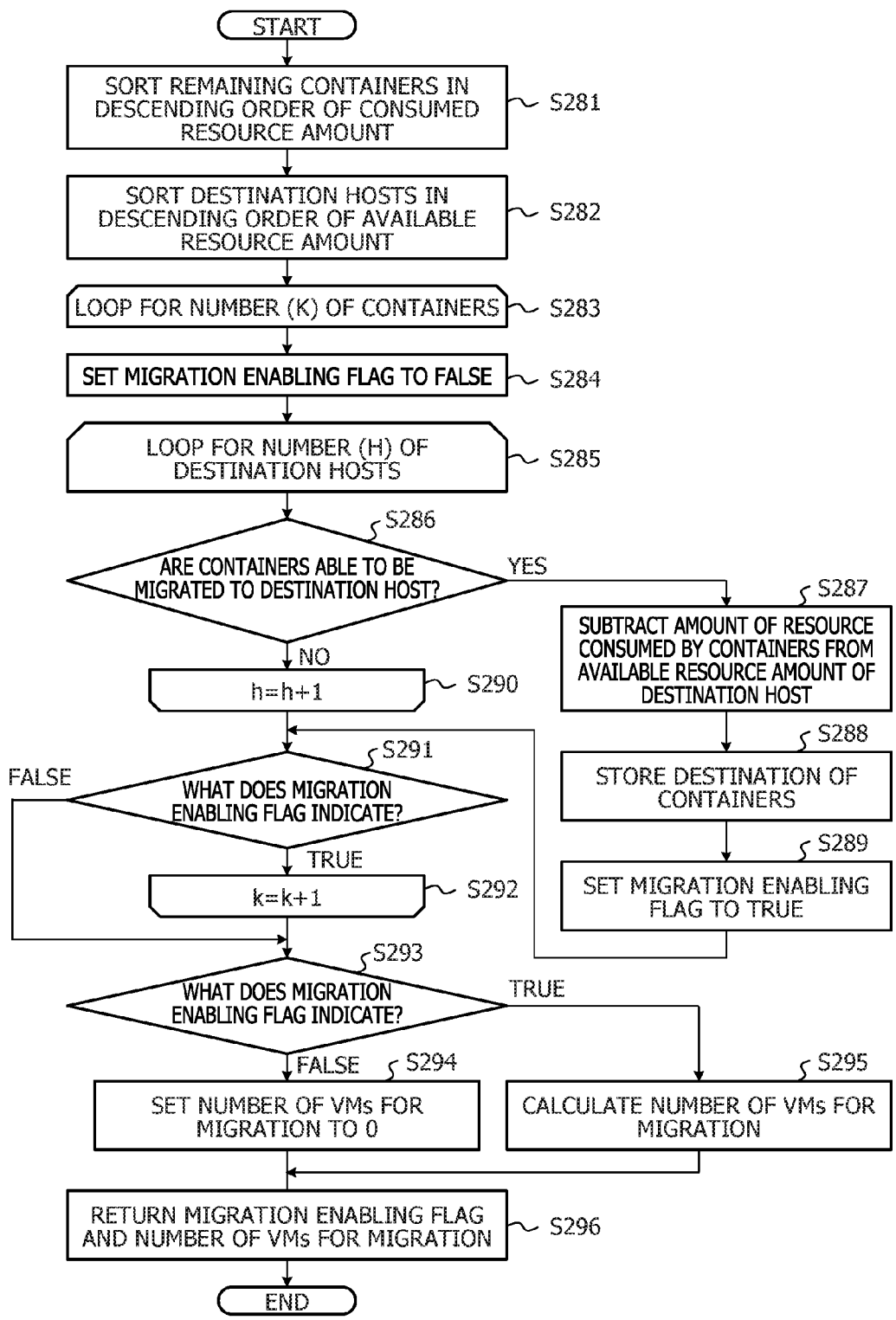
FIG. 24 is a flowchart of a subroutine process of determining whether or not containers that each have a middle or low priority and are executed in the host computers are able to be migrated.

FIG. 24 is a flowchart of the process of the subroutine S277 for determining whether or not containers that are executed in a host computer and of which priorities are middle or low are able to be migrated. First, the remaining containers that are not set to containers to be migrated in S267 or S269 illustrated in FIG. 23 are sorted in descending order of consumed resource amount (in S281). Then, the hosts that are the destination candidates to which the containers may be migrated are sorted in descending order of available resource amount (in S282).

The number of the containers sorted in S281 is K (K is a natural number). The remaining containers are selected in the order sorted in S281 until a variable k (k is a natural number) is changed from 1 to K, and processes of S283 to S292 are executed on the selected containers. Before whether or not the containers selected in S283 are able to be migrated is determined, the migration enabling flag is set to "false" (in S284). The number of the hosts that are the destination candidates of the containers is H. Then, the hosts that are the destination candidates are selected in the order sorted in S282 until the variable h is changed from 1 to H, and processes of S285 to S290 are executed on the selected hosts.

Since the containers selected in S283 do not include a container of which a priority is "high", whether or not each of the selected containers is able to be migrated to any of the destination host candidates is determined (in S286). If a container selected in S283 is able to be migrated to any of the destination host candidates (Yes in S286), the amount of a resource consumed by the container selected in S283 is subtracted from an available resource amount of a destination host candidate selected in S285 (in S287).

Next, information of the container selected in S283 and information of the destination host are stored in a table (not illustrated) that is included in the memory 133 or storage device 110 (in S288). The information, stored in the table in S288, of the destination of the container is used to calculate the number of VMs for the migration in S295 described later. The information, stored in the table in S288, of the destination of the container may be referenced if the container will be migrated in the future. Then, the migration enabling flag is set to "true" (in S289) and the process exits a loop of S285 to S290.

If the selected container is not able to be migrated to any of the destination host candidates (No in S286), the variable h is changed to change the destination host candidate to another destination host candidate (in S290). Then, whether or not the container selected in S283 is able to be migrated to the other destination host candidate is determined again (in S286).

If the container is able to be migrated to any of the destination host candidates, processes of S287 to S289 are executed and the process exits a loop of S285 to S290 in a state in which the migration enabling flag indicates "true". On the other hand, if the container is not able to be migrated to any of the destination host candidates, the process exits the loop of S285 to S290 in a state in which the migration enabling flag indicates "false".

After the process exits the loop of S285 to S290, the state of the migration enabling flag is determined (in S291). If the migration enabling flag indicates "true" as a result of the determination of whether or not the container selected in S283 is able to be migrated ("true" in S291), the value k is updated (in S292) and processes of S284 to S292 are repeatedly executed on the next container. If at least one of remaining containers is not able to be migrated to any of the destination host candidates, the determination of whether or not other containers are able to be migrated is meaningless. Thus, if the migration enabling flag indicates "false" as a result of the determination of S291, the process exits a loop of S283 to S292.

After the process exits the loop of S283 to S292, the migration enabling flag is determined again (in S293). If the migration enabling flag indicates "true" in the determination of S293, the information stored in the table in S288 is referenced and the number of VMs for the migration or the number of VMs to be newly generated for the migration of the containers is calculated (in S295). On the other hand, if the migration enabling flag indicates "false" in the determination of S293, the number of VMs for the migration is set to 0 (in S294). Then, the number, calculated in S295, of VMs for the migration and the migration enabling flag are returned as return values of the subroutine S277 (in S296).

When the process exits the subroutine S277, the process proceeds to S278 illustrated in FIG. 23 and the return values returned in S277 are returned as return values of the subroutine S209 (in S278). When the process exits the subroutine S209, the process proceeds to the process of S211 illustrated in FIG. 18.

Returning to FIG. 18, processes after S211 of the flowchart illustrated in FIG. 18 are described below. If all the containers are determined to be able to be migrated on a container basis (Yes in S211), the migration enabling flag is set to "true" (in S213). In this case, the number of VMs to be newly generated for the migration of the separated containers is added to the list 400 illustrated in FIG. 16 (in S213). If all the containers are determined not to be able to be migrated on a container basis in the determination of S209 (No in S211), the migration enabling flag is set to "false" (in S212). Then, the number of VMs for the migration or the number of VMs to be newly generated for the migration of the containers is set to 0 (in S212).

Then, the value n is updated in S214 and whether or not VMs or containers executed on the next host are able to be migrated is determined. When the determination of whether or not the migration is able to be executed on all the hosts in S201 to S214 is terminated, the process proceeds to S215 illustrated in FIG. 19 through a connector B.

FIG. 19 is a flowchart of processes to be executed after the determination of whether or not the migration is able to be executed on all the hosts. In S215, the list 400, illustrated in FIG. 16, of the simulation results is referenced and the maximum value among numbers stored in the column for the "numbers of VMs to be newly generated" is obtained. Then, new VMs are generated based on the number (maximum value among the "numbers of VMs to be newly generated"), obtained in S215, of VMs to be newly generated, and data of the generated VMs is stored in the storage device 110 shared by the hosts 310 (in S216). In this case, the data may be stored as data in a state in which container OSs are executed on the generated VMs. If a VM and the like that are previously generated and are not used exist, the VM and the like are deleted (in S216).

After that, the list 400, illustrated in FIG. 16, of the simulation results is referenced, and if a host for which a migration enabling flag indicates "false" exists, information on the host for which the migration enabling flag indicates "false" is notified to the administrator of the information processing system 10. If the host for which the migration enabling flag indicates "false" exists, the administrator adds a hardware resource insufficient for the migration or adds a host computer.

As described above, in the embodiment, the administration manager 300 that is executed on the managing server 130 collects the amounts of resources consumed by VMs and containers executed in virtual environments on the host computers 100 and the monitor information such as communication states of the containers. The administration manager 300 determines combination priorities of the containers based on the collected monitor information. In preparation for failures of the host computers 100 and the maintenance of the host computers 100, the administration manager 300 simulates whether or not the VMs and containers are able to be migrated in advance. If containers are to be separated and migrated as a result of the simulation, a VM is generated on a destination of the containers in advance. Thus, if a failure of a host computer 100 occurs or the like, the migration may be executed without stopping business processes by application programs executed on VMs or containers.

Although the embodiment is described above, the embodiment is not limited to the above description and may be variously modified and changed. For example, the communication states of the containers may not be monitored by the agents 340 and may be monitored by the hypervisor 201 or the like. In addition, the indices for the amounts of resources consumed by VMs of the host computers and the indices for the amounts of resources consumed by the hardware of the host computers are not limited to the CPU resources and the memory resources and may be the amounts of other consumed hardware resources such as the amounts of consumed network communication lines.

The virtual environments provided by the aforementioned information processing system, a computer program for causing the computers to execute the processes of the administration manager, and a non-transitory computer-readable storage medium storing the program, are included in the scope of the embodiment. The non-transitory computer-readable storage medium is a memory card such as an SD memory card. The computer program may not be stored in the storage medium and may be transferred through an electric communication line, a wireless or wired communication line, a network represented by the Internet, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of computers each of which includes a processor configured to execute a program to generate virtual machines and to execute a program to generate a plurality of virtual operating systems which are execution environments for application programs provided by operating systems executed on the virtual machines, the plurality of virtual operating systems being operated independently from each other on the operating systems by sharing parts of operating systems executed on the virtual machines and having settings different for each of the plurality of virtual operating systems; and
   a managing device configured to execute migration to migrate the plurality of virtual operating systems executed on a computer among the plurality of computers to a virtual machine executed on another computer among the plurality of computers,
   wherein the managing device is further configured to
   acquire, from the virtual machines, information on communication settings of the plurality of virtual operating systems executed on the virtual machines executed on the plurality of computers,
   execute a simulation to detect, based on the acquired information on the communication settings of the plurality of virtual operating systems, a plurality of different virtual operating systems executed on a same virtual machine of the computer before the migration and that each run an application program which communicates with at least one other application program running on another one of the plurality of different virtual operating systems, and
   identify a plurality of virtual operating systems to be executed on the virtual machine on the another computer upon the migration as the detected plurality of different virtual operating systems, and
   cause the another computer to generate, on the another computer, the virtual machine to which the plurality of identified virtual operating systems are to be migrated before a situation that causes the plurality of identified virtual operating systems to be migrated occurs.

2. The information processing system according to claim 1, wherein the managing device is further configured to
   acquire, from the plurality of computers, monitor information indicating usage statuses of the processors included in the computers,
   determine, by referring to the acquired monitor information, the another computer that executes the virtual machine to which the identified plurality of virtual operating systems are to be migrated, based on the usage statuses of the processors of the computers and a usage status of a processor running the virtual machine on which the plurality of identified virtual operating systems are executed.

3. The information processing system according to claim 2, wherein the managing device is further configured to
   determine whether or not the virtual machines are able to be migrated by live migration on a virtual machine basis, by comparing, using the acquired monitor information, amounts of resources consumed by the virtual machines executed on the plurality of computers with available resource amounts of computers that are destination candidates of the live migration,
   identify, when a virtual machine that is not able to be migrated by the live migration on a virtual machine basis exists, the plurality of identified virtual operating systems to be executed on the virtual machine upon the migration, by detecting the plurality of different virtual operating systems which are executed on the same virtual machine that is not able to be migrated on the virtual machine basis and which run application programs communicating with each other, and
   cause the another computer to generate, on the another computer, the virtual machine to which the plurality of identified virtual operating systems are to be migrated.

4. The information processing system according to claim 2, wherein
   each of the virtual machines
   monitor whether or not a virtual operating system executed on the virtual machines communicate with an external of the virtual machines and
   transmit, to the managing device, information obtained by the monitoring and indicating whether or not the virtual operating system communicate with the external of the virtual machines, and
   the managing device is further configured to
   cause the another computer to generate, on the another computer, the virtual machine to which the plurality of identified virtual operating systems are to be migrated, when the managing device identifies the plurality of virtual operating systems to be executed on the same virtual machine upon the migration by referring to the information received from the virtual machines and indicating whether or not the plurality of virtual operating systems communicate with the external of the virtual machines.

5. The information processing system according to claim 4, wherein the managing device is further configured to
   cause a computer that is a destination candidate of the plurality of identified virtual operating systems to be migrated, to generate a virtual machine to which the plurality of identified virtual operating systems are to be migrated, based on an available resource of the computer that is the destination candidate of the plurality of identified virtual operating systems, when the managing device identifies a certain virtual operating system that does not communicate with another virtual operating system executed on the same virtual machine on which the certain virtual operating system is executed and that communicates with the external of the virtual machines by referring to the information received from the virtual machines.

6. The information processing system according to claim 2,
   wherein the managing device is further configured to
   determine, based on the usage statuses of the processors of the computers and a usage status of a processor executing the plurality of identified virtual operating systems, a number of virtual machines to be activated in advance on the another computer.

7. The information processing system according to claim 1, wherein
each of the virtual machines
monitors a command to set communication of the plurality of virtual operating systems for the activation of the plurality of virtual operating systems, and transmits, to the managing device, information obtained by the monitoring and indicating the communication settings of the plurality of virtual operating systems, and
the managing device is further configured to detect the plurality of different virtual operating systems that communicate with each other by referring to the information received from the virtual machines and indicating the communication settings of the plurality of virtual operating systems.

8. The information processing system according to claim 1,
wherein the managing device is further configured to stop processing on the virtual machine which is generated on the another computer until information that indicates that the plurality of identified virtual operating systems are to be migrated is generated.

9. A managing device comprising:
a memory configured to store a management program for managing a plurality of computers each of which includes a processor to execute a program to generate virtual machines and to execute a program to generate a plurality of virtual operating systems which are execution environments for application programs provided by operating systems executed on the virtual machines, the plurality of virtual operating systems being operated independently from each other on the operating systems by sharing parts of operating systems executed on the virtual machines and having settings different for each of the plurality of virtual operating systems; and
processing circuitry coupled to the memory and configured to execute migration to migrate virtual operating systems executed on a computer among the plurality of computers to a virtual machine executed on another computer among the plurality of computers,
wherein the processing circuitry is further configured to
acquire, from the virtual machines, information on communication settings of the plurality of virtual operating systems executed on the virtual machines executed on the plurality of computers,
execute a simulation to detect, based on the acquired information on the communication settings of the plurality of virtual operating systems, a plurality of different virtual operating systems executed on a same virtual machine of the computer before the migration and that each run an application program which communicates with at least one other application program running on another one of the plurality of different virtual operating systems, and
identify a plurality of virtual operating systems to be executed on the virtual machine on the another computer upon the migration as the detected plurality of different virtual operating systems, and
cause the another computer to generate, on the another computer, the virtual machine to which the plurality of identified virtual operating systems are to be migrated before a situation that causes the plurality of identified virtual operating systems to be migrated occurs.

10. A non-transitory computer-readable medium having stored therein a program that causes a managing device to execute a process, the process comprising:
generating a virtual machine on at least one of a plurality of computers each of which includes a processor configured to execute a program to generate a plurality of virtual operating systems which are execution environments for application programs provided by operating systems executed on the virtual machine, the plurality of virtual operating systems being operated independently from each other on the operating systems by sharing parts of operating systems executed on the virtual machines and having settings different for each of the plurality of virtual operating systems;
acquiring, from the virtual machines, information on communication settings of the plurality of virtual operating systems executed on the virtual machines executed on the plurality of computers;
executing a simulation to detect, based on the acquired information on the communication settings of the plurality of virtual operating systems, a plurality of different virtual operating systems executed on a same virtual machine of a computer among the plurality of computers before a migration and that each run an application program which communicates with at least one other application program running on another one of the plurality of different virtual operating systems, and
identify a plurality of virtual operating systems to be executed on a virtual machine on another computer among the plurality of computers upon the migration as the detected plurality of different virtual operating systems; and
causing the another computer to generate, on the another computer, the virtual machine to which the plurality of identified virtual operating systems are to be migrated before a situation that causes the plurality of identified virtual operating systems to be migrated occurs.

11. The non-transitory computer-readable medium according to claim 10, wherein the process further comprising:
acquiring, from the plurality of computers, monitor information indicating usage statuses of the processors included in the computers,
determining, by referring to the acquired monitor information, the another computer that executes the virtual machine to which the plurality of identified virtual operating systems are to be migrated, based on the usage statuses of the processors of the computers and a usage status of a processor running the virtual machine on which the plurality of identified virtual operating systems are executed.

12. The non-transitory computer-readable medium according to claim 11, wherein the process further comprising:
determining whether or not the virtual machines are able to be migrated by live migration on a virtual machine basis, by comparing, using the acquired monitor information, amounts of resources consumed by the virtual machines executed on the plurality of computers with available resource amounts of computers that are destination candidates of the live migration,
identifying, when a virtual machine that is not able to be migrated by the live migration on a virtual machine basis exists, the plurality of identified virtual operating systems to be executed on the virtual machine upon the migration, by detecting the plurality of different virtual operating systems which are executed on the same virtual machine that is not able to be migrated on the virtual machine basis and which run application programs communicating with each other, and causing the another computer to generate, on the another computer, the virtual machine to which the plurality of identified virtual operating systems are to be migrated.

13. The non-transitory computer-readable medium according to claim 11, wherein each of the virtual machines monitor whether or not a virtual operating system executed on the virtual machines communicate with an external of the virtual machines and transmit, to the managing device, information obtained by the monitoring and indicating whether or not the virtual operating system communicate with the external of the virtual machines, and the process further comprising:

causing the another computer to generate, on the another computer, the virtual machine to which the plurality of identified virtual operating systems are to be migrated, when the managing device identifies the plurality of virtual operating systems to be executed on the same virtual machine upon the migration by referring to the information received from the virtual machines and indicating whether or not the plurality of virtual operating systems communicate with the external of the virtual machines.

14. The non-transitory computer-readable medium according to claim 13, wherein the process further comprising:

causing a computer that is a destination candidate of the plurality of identified virtual operating systems to be migrated, to generate a virtual machine to which the plurality of identified virtual operating systems are to be migrated, based on an available resource of the computer that is the destination candidate of the plurality of identified virtual operating systems, when a certain virtual operating system is identified that does not communicate with another virtual operating system executed on the same virtual machine on which the certain virtual operating system is executed and that communicates with the external of the virtual machines by referring to the information received from the virtual machines.

15. The non-transitory computer-readable medium according to claim 11, wherein the process further comprising:

determining, based on the usage statuses of the processors of the computers and a usage status of a processor executing the plurality of identified virtual operating systems, a number of virtual machines to be activated in advance on the another computer.

16. The non-transitory computer-readable medium according to claim 10, wherein each of the virtual machines monitors a command to set communication of the virtual plurality of operating systems for the activation of the plurality of virtual operating systems, and transmits, to the managing device, information obtained by the monitoring and indicating the communication settings of the plurality of virtual operating systems, and the process further comprising detecting the plurality of different virtual operating systems that communicate with each other by referring to the information received from the virtual machines and indicating the communication settings of the plurality of virtual operating systems.

17. The non-transitory computer-readable medium according to claim 10, wherein the process further comprising stopping processing on the virtual machine which is generated on the another computer until information that indicates that the plurality of identified virtual operating systems are to be migrated is generated.

* * * * *